| (12) | United States Patent | (10) Patent No.: | US 9,953,091 B1 |
|---|---|---|---|
| | Gueye | (45) Date of Patent: | Apr. 24, 2018 |

(54) METHOD AND SYSTEM FOR FACILITATING SOCIAL NETWORKING BASED ON EVENTS

(71) Applicant: Mamadou Mande Gueye, Washington, DC (US)

(72) Inventor: Mamadou Mande Gueye, Washington, DC (US)

(*) Notice: Subject to any disclaimer, the term of this patent is extended or adjusted under 35 U.S.C. 154(b) by 0 days.

(21) Appl. No.: 15/713,357

(22) Filed: Sep. 22, 2017

Related U.S. Application Data

(60) Provisional application No. 62/402,401, filed on Sep. 30, 2016.

(51) Int. Cl.
*G06F 17/30* (2006.01)
*G06F 7/02* (2006.01)
*G06F 3/0482* (2013.01)

(52) U.S. Cl.
CPC ........ *G06F 17/30867* (2013.01); *G06F 7/026* (2013.01); *G06F 3/0482* (2013.01)

(58) Field of Classification Search
CPC ... G06F 17/30867; G06F 7/026; G06F 3/0482
See application file for complete search history.

(56) References Cited

U.S. PATENT DOCUMENTS

| 9,135,663 B1* | 9/2015 | Heiferman | G06Q 50/01 |
| 2015/0058059 A1* | 2/2015 | Kahan | G06Q 10/1095 |
| | | | 705/7.19 |
| 2015/0127638 A1* | 5/2015 | Parks | G06F 17/3087 |
| | | | 707/723 |

* cited by examiner

*Primary Examiner* — Tyler Torgrimson

(57) ABSTRACT

Disclosed is a computer implemented method of facilitating social networking. The method may include presenting a plurality of events and dates to a user based on at least one personal characteristic of the user. Further, the method may include receiving, a plurality of date-interest indicators and event-interest indicators representing one of approval, disapproval and possibility. Furthermore, the method may include determining a plurality of compatibility levels between the user and the plurality of dates. Additionally, the method may include generating a prioritized plurality of dates and events based on the plurality of date-interest indicators and event-interest indicators. Further, the method may include receiving, a selection of one or more of an event and a date. Additionally, the method may include presenting one or more of the prioritized plurality of dates and the prioritized plurality of events based on the selection of one or more of the event and the date.

18 Claims, 18 Drawing Sheets

200

202 — Presenting each of a plurality of events and a plurality of dates to a user, wherein each of the plurality of events and the plurality of dates are identified based on at least one personal characteristic of the user

↓

204 — Receiving a plurality of date-interest indicators corresponding to the plurality of dates, wherein each of the plurality of date-interest indicators represents one of approval, disapproval and possibility of the user engaging correspondingly with each date the plurality of dates

↓

206 — Receiving a plurality of event-interest indicators corresponding to the plurality of events, wherein each of the plurality of event-interest indicators represents one of approval, disapproval and possibility of the user attending correspondingly each event of the plurality of events

↓

208 — Determining a plurality of compatibility levels between the user and the plurality of dates based on a comparison of the at least one personal characteristic of the user and at least one personal characteristic of the plurality of dates

↓

210 — Generating a prioritized plurality of dates based on a plurality of date-interest indicators associated with the plurality of dates and a plurality of compatibility levels associated with the plurality of dates

↓

212 — Generating a prioritized plurality of events based on a plurality of event-interest indicators associated with the plurality of events

↓

214 — Receiving a selection of at least one of an event and a date

↓

216 — Presenting at least one of the prioritized plurality of dates and the prioritized plurality of events based on the selection of at least one of the event and the date

| Presenting an icebreaker to at least one of the user and the date upon expiration of a predetermined time period from start of the event, wherein the icebreaker is identified based on at least one of the at least one personal characteristic of the user and the at least one personal characteristic of the date | 702 |

↓

| Receiving an icebreaker interaction from at least one of the user and the date | 704 |

FIG. 7

METHOD AND SYSTEM FOR FACILITATING SOCIAL NETWORKING BASED ON EVENTS

FIELD OF DISCLOSURE

The present disclosure generally relates to digital data processing. More specifically, the disclosure relates to methods and systems for facilitating social networking based on events.

BACKGROUND

Currently, there are several social networking applications that enable users to discover and connect with other users. Most such applications allow a User to specify criteria based on which other users are identified and presented to the User for selection. Generally, these criteria include characteristics of other users such as, demographic information, interests, educational and professional background and so on.

However, while such social networking application facilitate forming social connections, most do not offer any features to facilitate the connected users to participate in events. Users are therefore required to access other even management applications in order to search and select events to attend along with their social connections. This creates additional burden on users who wish to attend events along with their social connections.

Further, while some social networking applications may offer information about events, for example, in the form of advertisements, it does not lead to successful participation due to several reasons. On one hand, although socially connected users may share similar general interests, their specific interest in a given event may differ to due time varying factors. Accordingly, an event that may be interesting to a User may not be of interest to other users socially connected to the user. On the other hand, while the user's interest in specific types of events may be shared by other users, a level of compatibility between the User and other users is not considered in presenting the User with potential users with whom the User may attend an event. Further, users currently do not have access to an intuitive User interface that can facilitate selection of both other users (e.g. dates) and events.

Accordingly, there is a need for methods and systems for facilitating social networking based on events, while overcoming one or more of the aforementioned drawbacks.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope According to some embodiments, a computer implemented method of facilitating social networking is provided. The computer implemented method may include presenting each of a plurality of events and a plurality of dates to a user. Further, each of the plurality of events and the plurality of dates may be identified based on at least one personal characteristic of the user. Furthermore, the computer implemented method may include receiving, a plurality of date-interest indicators corresponding to the plurality of dates. Further, each of the plurality of date-interest indicators represents one of approval, disapproval and possibility of the User engaging correspondingly with each date the plurality of dates. Additionally, the computer implemented method may include receiving, a plurality of event-interest indicators corresponding to the plurality of events. Further, each of the plurality of event-interest indicators represents one of approval, disapproval and possibility of the User attending correspondingly each event of the plurality of events. Furthermore, the computer implemented method may include determining a plurality of compatibility levels between the User and the plurality of dates based on a comparison of the at least one personal characteristic of the User and at least one personal characteristic of the plurality of dates. Further, the computer implemented method may include generating a prioritized plurality of dates based on a plurality of date-interest indicators associated with the plurality of dates and a plurality of compatibility levels associated with the plurality of dates. Additionally, the computer implemented method may include generating a prioritized plurality of events based on a plurality of event-interest indicators associated with the plurality of events. Further, the computer implemented method may include receiving, a selection of one or more of an event and a date. Furthermore, the computer implemented method may include presenting one or more of the prioritized plurality of dates and the prioritized plurality of events based on the selection of one or more of the event and the date.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 2 illustrates a flowchart of a method 200 of facilitating social networking based on events, in accordance with some embodiments.

FIG. 7 illustrates a flowchart of a method 700 of facilitating social networking based on events by presenting an icebreaker to a user, in accordance with some embodiments.

DETAILED DESCRIPTION

Figure 1:
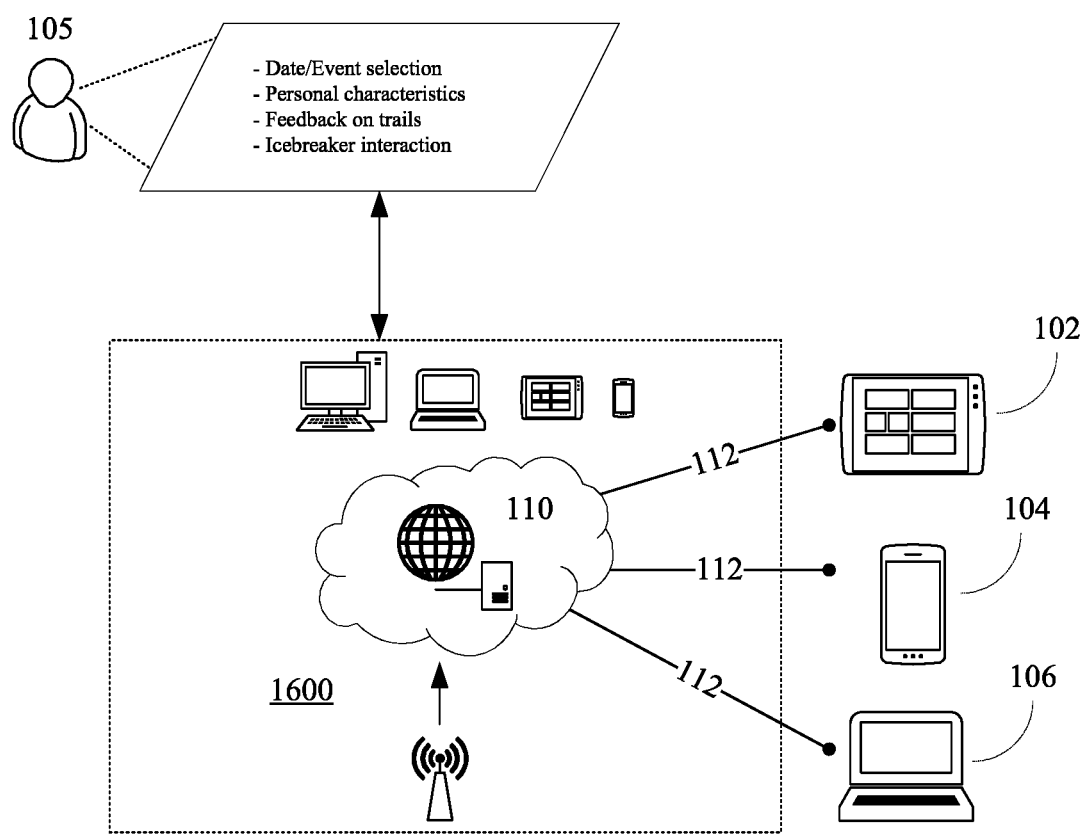
FIG. 1 illustrates a block diagram of an operating environment consistent with the present disclosure.

As a preliminary matter, it may readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, may be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of social networking, embodiments of the present disclosure are not limited to use only in this context.

I. Platform Overview

Consistent with embodiments of the present disclosure, an online platform (also referred to herein as "platform" or "social networking platform" or "ArmCandy platform") for facilitating social networking based on events may be provided. This overview is provided to introduce a selection of concepts in a simplified form that are further described below. This overview is not intended to identify key features or essential features of the claimed subject matter. Nor is this overview intended to be used to limit the claimed subject matter's scope. The online platform may be used by individuals or companies to facilitate social networking.

According to some embodiments, the present disclosure provides a social networking app (also referred to as "ArmCandy" herein) executable on a mobile device (e.g. smartphone) that enables users to find matching dates and events.

II. Platform Configuration

FIG. 1 is an illustration of a platform consistent with various embodiments of the present disclosure. By way of non-limiting example, the online platform 100 for facilitating social networking based on events may be hosted on a centralized server 110, such as, for example, a cloud computing service. The centralized server may communicate with other network entities, such as, for example, mobile devices (such as a tablet computer 102, a smartphone 104, a laptop 106 etc.) over a communication network 112, such as, but not limited to, the Internet. Additionally, the centralized server 110 may include a database configured for storing event related data. Alternatively, and/or additionally, the centralized server 110 may be configured to communicate with other network entities in order to retrieve event related data. Further, the database may be configured to store User related data, such as, personal characteristics of users, history of interactions with the online platform, event trails, User feedback on event trails, points associated with users, icebreakers, event attendance of users and so on.

A User 105, may access platform 100 through a software application. The software application may be embodied as, for example, but not be limited to, a website, a web application, a desktop application, and a mobile application compatible with a computing device 1800. One possible embodiment of the software application may be provided by ArmCandy™ products and services. Accordingly, in an instance, the User 105 may be presented with a plurality of events and a plurality of potential dates based on personal characteristics of the User 105. Further, the User 105 may be enable to select one or more events and one or more potential dates by providing one of an approval, a disapproval and a possibility. Based on the User 105's selection of dates and events, the online platform may prioritize/rank the selected events and/or the selected dates based on various criteria such as, for example, compatibility with respect to the User 105. The prioritized list of potential dates and/or the events may be presented to the User 105 for confirmation and/or subsequent selection.

As may be detailed with reference to FIG. 18 below, the computing device through which the online platform may be accessed may comprise, but not be limited to, for example, a desktop computer, laptop, a tablet, or mobile telecommunications device. As may be detailed with reference to FIG. 18 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

III. Platform Operation

Although methods 200 through 1200 have been described to be performed by platform 100, it should be understood that computing device 1800 may be used to perform the various stages of methods 200 through 1200. In other words, methods 200 through 1200 may be computer implemented methods. Furthermore, in some embodiments, different operations may be performed by different networked elements in operative communication with computing device 1800. For example, server 110 may be employed in the performance of some or all of the stages in methods 200 through 1200. Moreover, server 110 may be configured much like computing device 1800.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 200 through 1200 may be described in greater detail below.

FIG. 2 illustrates a flowchart of a method 200 of facilitating social networking based on events, in accordance with some embodiments. The method may include a stage 202 of presenting each of a plurality of events and a plurality of dates to a user. Further, each of the plurality of events and the plurality of dates may be identified based on at least one personal characteristic of the user.

In some embodiments, the at least one personal characteristic may include a perceived personality, an interest and an intention. In some embodiments, the at least one personal characteristic may be identified further based on one or more of a location of the user, a mood of the user, response to an additional survey, and a spending gauge associated with the user. In some embodiments, the at least one personal characteristic may be identified further based on interaction with other users, icebreaker usage, icebreaker interaction, number of available credits associated with the user, events hearted by the user, events checked by the user, events attended by the user, gameplan icons selected by the user, trails used or created by the user, a Belt-Level obtained by the User and DNA rating scale of the user.

Additionally, the method may include a stage 204 of receiving, a plurality of date-interest indicators corresponding to the plurality of dates. Further, each of the plurality of date-interest indicators represents one of approval, disapproval and possibility of the User engaging correspondingly with each date the plurality of dates. Furthermore, the method may include a stage 206 of receiving, a plurality of event-interest indicators corresponding to the plurality of events. Further, each of the plurality of event-interest indicators represents one of approval, disapproval and possibility of the User attending correspondingly each event of the plurality of events.

In some embodiments, the method may further include identifying the plurality of events based on a budget associated with the user. In some embodiments, an average cost of attending each event of the plurality of events may be at most 130% of the budget associated with the user.

Additionally, the method may include a stage 208 of determining a plurality of compatibility levels between the User and the plurality of dates based on a comparison of the at least one personal characteristic of the User and at least one personal characteristic of the plurality of dates. Further, the method may include a stage 210 of generating a prioritized plurality of dates based on a plurality of date-interest indicators associated with the plurality of dates and a plurality of compatibility levels associated with the plurality of dates. Furthermore, the method may include a stage 212 of generating a prioritized plurality of events based on a plurality of event-interest indicators associated with the plurality of events.

Figure 15:
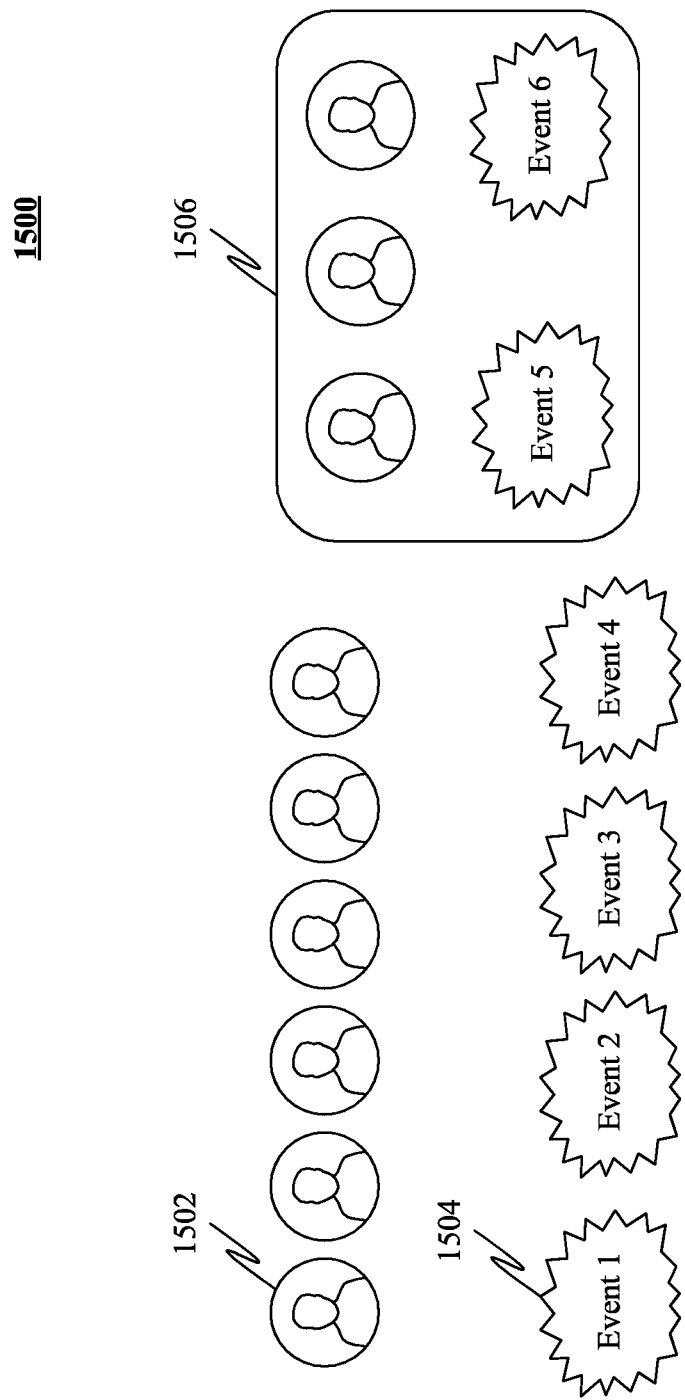
FIG. 15 illustrates a screenshot 1500 of a User interface for facilitating social networking based on events depicting a User interface for enabling a User to select at least one date and at least one event, in accordance with some embodiments.

Further, the method may include a stage 214 of receiving, a selection of one or more of an event and a date. For example, as illustrated in FIG. 15, the User may be presented with a User interface (GUI) 1500 comprising the plurality of dates 1502 and the plurality of events 1504. Accordingly, the User may be able to select one or more dates by clicking and/or selecting dates 1502. Similarly, the User may be able to select one or more events by clicking and/or selecting events 1504. Additionally, in some embodiments, the User interface may include a drop zone 1506. Accordingly, the User may be able to perform a drag operation on one or more of the plurality of dates 1502 and the plurality of events 1504 into the drop zone 1506.

Furthermore, the method may include a stage 216 of presenting one or more of the prioritized plurality of dates and the prioritized plurality of events based on the selection of one or more of the event and the date.

Figure 14:
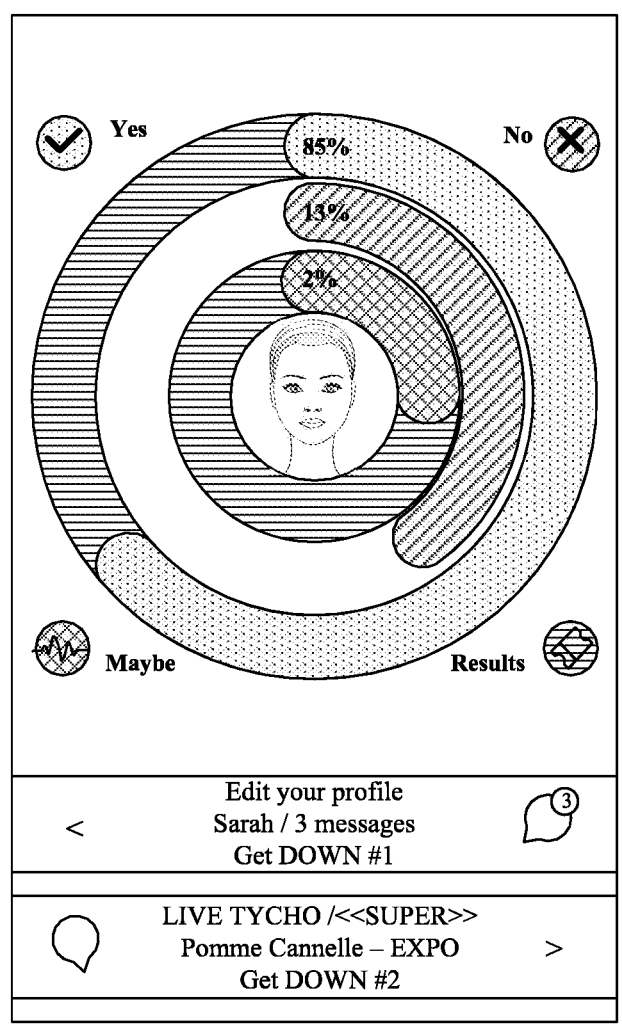
FIG. 14 illustrates a screenshot 1400 of a mobile app for facilitating social networking based on events depicting aggregated date-interest indicator of a user, in accordance with some embodiments.

In some embodiments, the method may further include presenting three date-interest-GUI elements characterized by three colors for each date of the plurality of dates. Further, the three colors correspond respectively to approval, disapproval and possibility. Further, receiving the plurality of date-interest indicators may include receiving an interaction with one of the three date-interest-GUI elements from the user. For example, as illustrated in FIG. 14, the User may be presented with User interface 1400 with User interface elements "Yes", "No" and "May be" corresponding respectively to approval, disapproval and possibility to be associated with a date of the plurality of dates.

Figure 13:
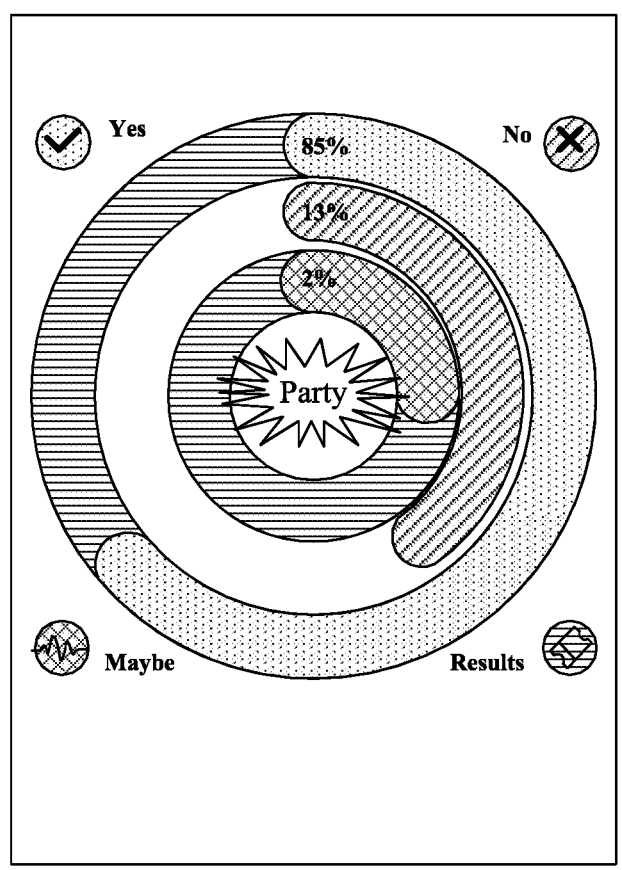
FIG. 13 illustrates a screenshot 1300 of a mobile app for facilitating social networking based on events depicting aggregated date-interest indicator of an event (e.g. party), in accordance with some embodiments.

In some embodiments, the method may further include presenting three event-interest-GUI elements characterized by three colors for each event of the plurality of events. Further, the three colors correspond respectively to approval, disapproval and possibility. Further, receiving the plurality of event-interest indicators may include receiving an interaction with one of the three event-interest-GUI elements from the user. For example, as illustrated in FIG. 13, the User may be presented with User interface 1300 with User interface elements "Yes", "No" and "May be" corresponding respectively to approval, disapproval and possibility to be associated with an event of the plurality of events. Further, each of "Yes", "No" and "May be" may be characterized by different colors.

In some embodiments, the method may further include: generating an aggregated date-interest indicator for the date based on aggregating date-interest indicators associated with the date received from a plurality of users; and presenting the aggregated date-interest indicator associated with the date to the user. For example, as illustrated in FIG. 14, the aggregated date indicator for the date may be graphically rendered, using for example, concentric circular segments with peripheral lengths corresponding to a quantity of associated interest indicator. For instance, as shown, 85% of users provided approval, 13% of users provided disapproval and 2% of users provided a possibility of dating the date. Likewise, in some embodiments, a similar graphical rendering may be performed to depict an aggregated event-interest indicator for an event, as exemplarily illustrated in FIG. 13.

In some embodiments, the method may further include presenting a plurality of points indicator corresponding to one or more of the plurality of events and the plurality of dates. Further, a points indicator corresponding to one or more of an event and a date represents a number of points to be expended by the User in association respectively with one or more of attending the event and inviting the date.

In some embodiments, the method may further include determining a location of the User using a dongle configured to be attached to a mobile device of the user. In some embodiments, the dongle may be further configured to provide backup power to the mobile device.

Figure 3:
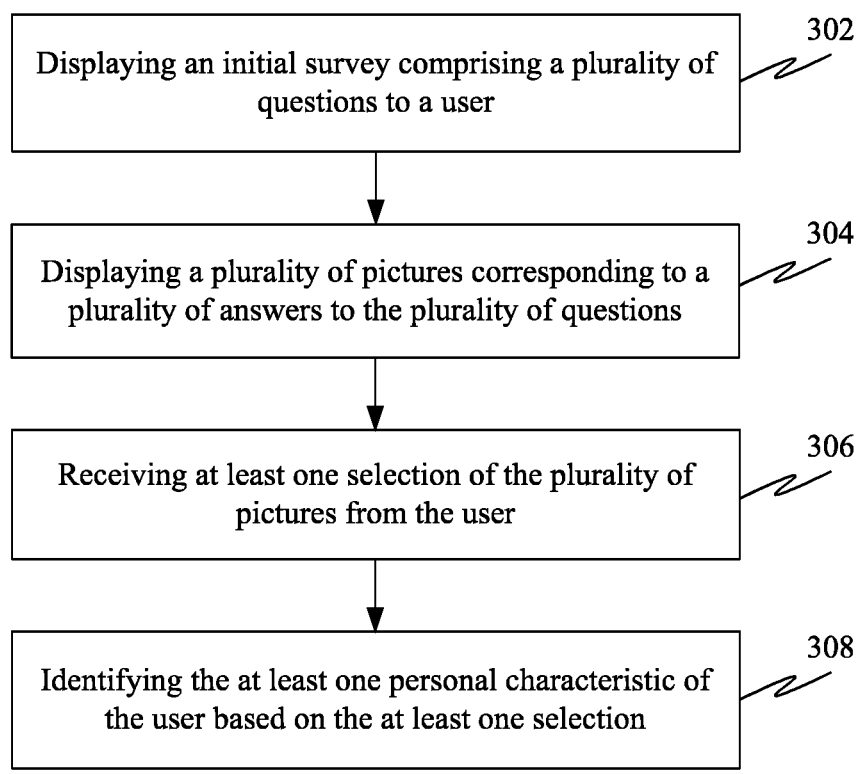
FIG. 3 illustrates a flowchart of a method 300 of facilitating social networking based on events by identifying personal characteristics of a user, in accordance with some embodiments.

FIG. 3 illustrates a flowchart of a method 300 of facilitating social networking based on events by identifying personal characteristics of a user, in accordance with some embodiments. In some embodiments, the stages of the method 300 may be performed in addition to the method 200. Accordingly, the method 300 may include a stage 302 of displaying an initial survey including a plurality of questions to a user. Further, the method 300 may include a stage 304 of displaying a plurality of pictures corresponding to a plurality of answers to the plurality of questions. Additionally, the method 300 may include a stage 306 of receiving at least one selection of the plurality of pictures from the user. Further, the method 300 may include a stage 308 of identifying the at least one personal characteristic of the User based on the at least one selection.

Figure 4:
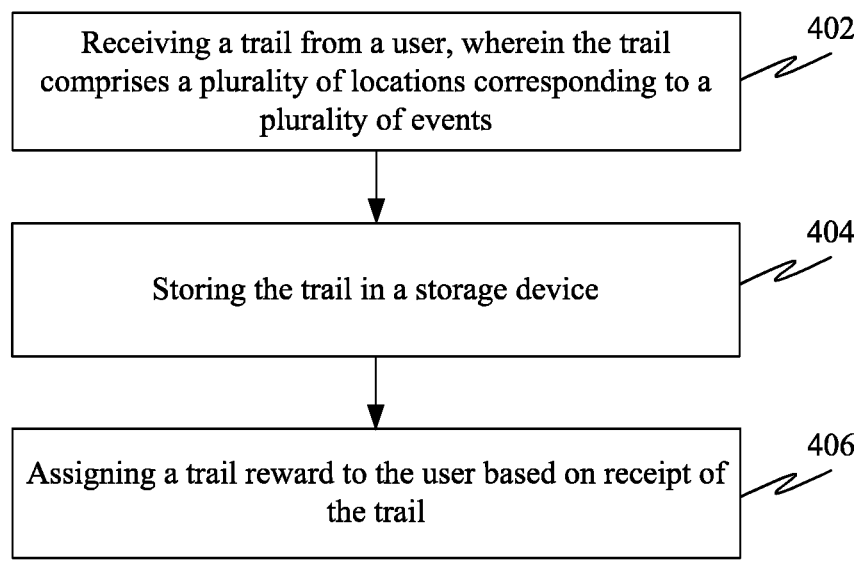
FIG. 4 illustrates a flowchart of a method 400 of facilitating social networking based on events by monitoring event trails of a user, in accordance with some embodiments.

FIG. 4 illustrates a flowchart of a method 400 of facilitating social networking based on events by monitoring event trails of a user, in accordance with some embodiments. In some embodiments, the stages of the method 400 may be performed in addition to the method 200. Accordingly, the method 400 may further include a stage 402 of receiving a trail from a user. Further, the trail may include a plurality of locations corresponding to a plurality of events. Additionally, the method 400 may include a stage 404 of storing, the trail in a storage device. Further, the method 400 may include a stage 406 of assigning a trail reward to the User based on receipt of the trail.

Figure 5:
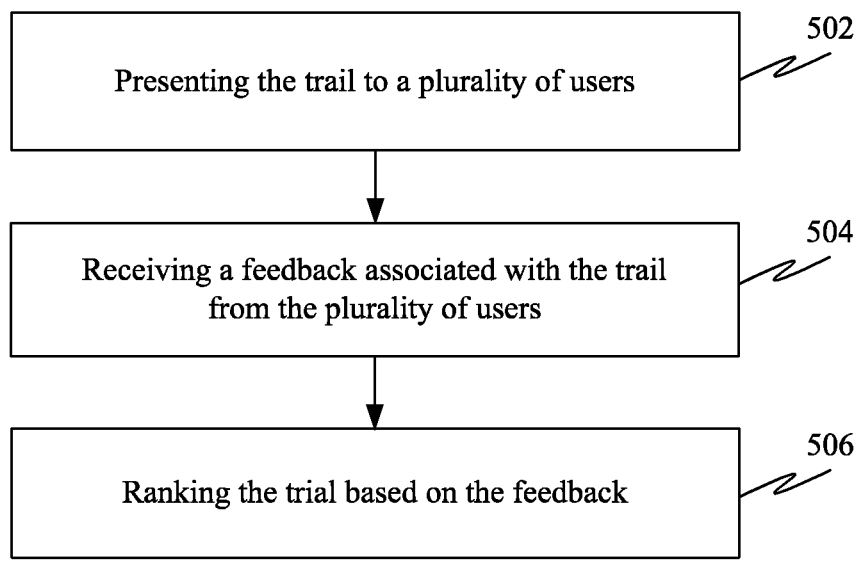
FIG. 5 illustrates a flowchart of a method 500 of facilitating social networking based on events by ranking event trails of a user, in accordance with some embodiments.

FIG. 5 illustrates a flowchart of a method 500 of facilitating social networking based on events by ranking event trails of a user, in accordance with some embodiments. In some embodiments, the stages of the method 500 may be performed in addition to the method 200. Accordingly, the method 500 may include a stage 502 of presenting the trail to a plurality of users. Additionally, the method 500 may include a stage 504 of receiving a feedback associated with the trail from the plurality of users. Furthermore, the method 500 may include a stage 506 of ranking the trail based on the feedback. In some embodiments, assigning the trail reward may be further based on the feedback associated with the trail.

Figure 6:
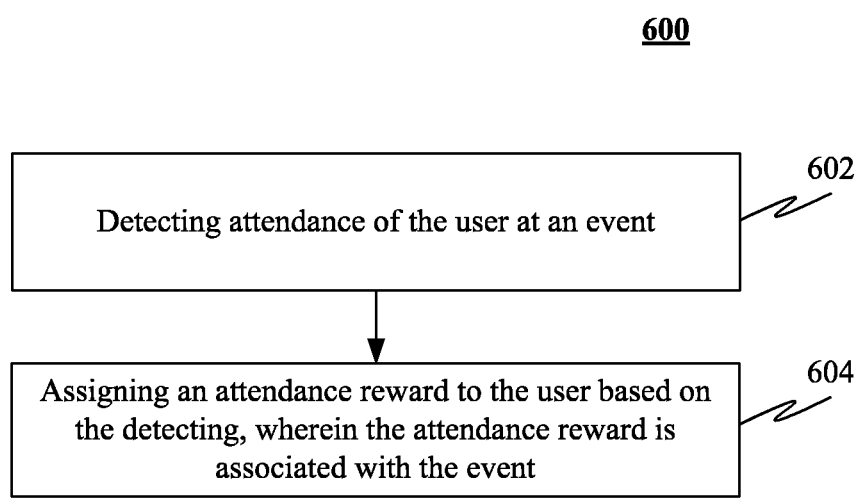
FIG. 6 illustrates a flowchart of a method 600 of facilitating social networking based on events by detecting event attendance of a user, in accordance with some embodiments.

FIG. 6 illustrates a flowchart of a method 600 of facilitating social networking based on events by detecting event attendance of a user, in accordance with some embodiments. In some embodiments, the stages of the method 600 may be performed in addition to the method 200. Accordingly, the method 600 may include a stage 602 of detecting attendance of the User at an event. Further, the method 600 may include a stage 604 of assigning an attendance reward to the User based on the detecting. Further, the attendance reward may be associated with the event. In some embodiments, the attendance reward associated with the event may be based on a type of event. In some embodiments, the attendance reward may be further based on one or more of an engagement rating received from the date, a frequency of events attended and a number of events attended.

FIG. 7 illustrates a flowchart of a method 700 of facilitating social networking based on events by presenting an icebreaker to a user, in accordance with some embodiments. In some embodiments, the stages of the method 700 may be performed in addition to the method 200.

Accordingly, the method 700 may include a stage 702 of presenting an icebreaker to one or more of the User and the date upon expiration of a predetermined time period from start of the event. Further, the icebreaker may be identified based on one or more of the at least one personal characteristic of the User and the at least one personal characteristic of the date. Additionally, the method 700 may include a stage 704 of receiving an icebreaker interaction from one or more of the User and the date.

Exemplary Embodiments:

The present disclosure provides an application that synchronizes the compatibility profiles of an in-depth dating service, the indulgence of a rating system in a hook-up application, the independence of a perfectly tailored Event planner and the fast-paced sophisticated procedure of the prefect orchestrator within a personalized intricate data network, streamlined operating system, the revolutionary manipulation reels to organize a perfect Outing and the impossibility of rejection. All built upon four individual revenue streams woven into an extensive system to personalize every experience to each individual User in very little time on any budget.

The present invention combines the need for compatibility with the inclination for desirable company in a fully functional, in-depth active dating environment in conjunction with their own Ticketing Agency, owned and operated by the present invention's managing authority.

No existing system has been able to create a sophisticated human connection service that combines in-depth compatibility with the fast-paced 'just for fun' applications. The present invention's active dating environment is a revolutionary way to connect people by creating a system that gets Users out and actively enjoying social events with congenial company. The present invention's system makes it easy for Users to find exciting Events and plan Outings with ease, by focusing on the Outings and allowing pre-determined User compatibility to ensure that rejection is no longer looming over every attempt to enjoy great events.

Herein follows an overview of the present invention's major steps and processes. A more detailed list and associated descriptions follow after these.

The list follows: An electronic (Smartphone) device capable of downloading the present invention's application with Bluetooth technology, WiFi or Data Network connection, Signup and ensure proper log in, Creation of a profile in the present invention's sign-up page with Information and Photographs required, an Intake survey, Complete tutorial explanation and event promos, complete Mood Gauge Points, Select desirable Dates and Events in the HomePage Map, Gameplan Icon Filtering System, Evaluate Dates in the present invention's ArmCandy Page or Homepage Map, RYG Tech. system, Evaluate Events in the Outings Page with check, heart, x, Select Date(s) and Event(s) in Gameplan Page, Drag & Drop Zone Tech, Finalize Outing. Pricing, 30% increase), Metered Dates, Multiple Dates, Send invitation with push notifications metered notifications with multiples, Send confirmation with 2 hour time advance explanation, Send Reminders with time notifications and tardiness, Time, Duration, Location, Outing Begins, Icebreakers are initiated, Check-ins are initiated, Leave Date early, Outing radius & Bluetooth local, Evaluations and Additional Surveys &points, Profile Page, Star Rating, Point Rating for Dates, Point Bank for all, Cancel Toggle, User's Profile collects information, User's Profile is linked and categorized, Compatibility system gains specify the present invention's Network, Promotion of certain Events and Dates becomes accurate and more frequent Common Outings, combine personal with interest compatibility, create trails, create zones or events and impact Feedback loop rewards User's for Using gains points for spending points, Promotions for great Users to become a date, belt-level impacts Promotional Events and Discounts, Promotions for excellent Dates, Meters, higher point value, more frequently filtered, Solo-mode available, Cash out points, affiliated partnerships % profit, Ticketing Agency an asset, SYSTEM, Mobility and TECH FUNCTIONS, Sync Accounts, and Verification.

Herein follows a brief overview of the Setup and login process.

User may download the present invention's application onto a Smartphone or other mobile device capable of supporting the program and the Bluetooth technology it requires. This application requires connection to a 3G, 4G, LTE or WiFi to connect to the present invention's Network. In the invention's embodiment, the download is free; other embodiments may utilize some form of payment.

Once downloaded the first screen may show a "LogIn or Signup" Pop-up superimposed over the present invention's background. The User may enter in a valid email address less than or equal to 255 characters long following a pattern of _____@_____._____, User's first name, User's last name, a password that is different than all other submitted information and their date of birth which is a past date greater than or equal to 18 years prior to the current date. If the User has satisfied all of this information, then tap "LogIn". If the login is successful, then the server should send a Web Token in its response. This token may then be used for further communication with the server. Almost All API requests thereon may require this Web Token to be provided in its request, otherwise the request may fail and prompt the message "Email or password incorrect". Once the User has finished the initial Sign-up a short survey may be prompted to begin development of the User's Profile. The 'Initial Survey' is a short five question survey, which displays a series of photographs as the potential options to best describe User's answer to each of the five basic questions. The answers to the survey may begin categorizing the User's perceived personality, interests and intentions. This Photo-testing strategy is a window into the active dating intentions to keep the User engaged and interactive in the present invention's approach to social Outings. Once the initial survey has set some parameters for the User's Profile, page may re-direct to the present invention's application Homepage Map to begin the tutorial. The tutorial may give a quick interactive overview of the application including highlighting the point balance on the screen and the Homepage Map. The present invention's application utilizes the purchase and exchange of points. Every User may be given an initial 500 points and therefrom MUST have a minimum balance of 500 points at all times. These points are purchased for 9.97 points per $1.00 and are used to distinguish different Dates, Events, Promotional Items, Ticketed Events and services provided by any affiliated companies. The Points are Used, Gained, Rewarded by Point Exchange within the application in a simple smooth transition. Once the Tutorial is completed the User may be asked to select an accurate profile picture, which must be a photograph of their face to complete the sign-up process. It may be requested that all Users and Dates verify all of the photos submitted to avoid misleading anyone and ensuring proper representation. With all of the sign-up procedures completed the User is now ready to use the Homepage MAP. The present invention's Homepage Map is an interactive map that embodies the available events, trails, zones, and Dates. As the User travels through a city, different Icon interactions may present on the Interactive Homepage Map. Events, trails, zones, and Dates within User radius may be prompted, in accordance with the User's Location, Belt-Level, Points available, Event Attendance, Friends and Allies. By taping one of the mood gauge filtration Icon options the User may be taken to the Homepage Map where all profiles and Events that appear are pre-filtered to compliment any information known about the User and their preferences. Initially, the only information may be from the short 'Initial Survey' during the Sign-up procedure, as the User begins using the application, more information on their preferences may be collected and the results may continue to be filtered and sorted to meet their desires. This is the 'User's Profile' within the present invention's System that orchestrates the present invention's Network. The Homepage Map is consistent of a system of icons. Use of an iconic language illustrates User progress by way of color, shape, shade, movement, dimensionality, and form. The aforementioned iconic values are accessible by tapping a genie bottle button that reveals interactive Icon Screen that filters or modifies the results of your event based upon which icons are selected, pre selected, and de selected. The Gameplan Icon screen may superimpose over The Homepage Map until the modification process is complete, icons that are active may be color filed non active Icons may remain in black and white.

In an instance, as the User progresses through challenges, trails, Outings, and events, corresponding Belt-Levels with different colors may be displayed indicating progress to the User. The application on Homepage Map associated icons may match the color of the associated Users Belt-Level as follows:

1. White Belt=Turquoise Belt Icons Sync
2. Yellow Belt=Yellow Icons Belt Sync
3. Orange=Orange Icon Belt Sync
4. Purple=Purple Icon Belt Sync
5. Green=Green Level Belt Icon Sync
6. Blue=Blue Level Icon Belt Sync
7. Brown=Brown Level Belt Icon Sync
8. Red=Red Level Icon Belt Sync
9. Black=Black Level Icon Belt Sync Further, female users may obtain Ribbons of various colors, representative of levels, such as Bronze, Silver, Gold, Platinum and Black Diamond. Likewise, male users may obtain Bowties such as Bronze, Silver, Gold, Platinum and ONYX respectively from the first bowtie attained to the last Bowtie attained.

The Ribbons or Bowties may represent the notches or degrees of accent towards next Belt-Level. Further, within the application, each interaction may be reinforced by gradually evolving color, luminosity patterns, translucency, volumes, forms, dimensionality, perspective, level and facade.

Additionally, the following non-Gameplan Icons corresponding to various categories may be provided.

Main Decision Based Icons
   1. Checked
   2. Dismiss
   3. Hearted
   4. Little Check
   5. Plus/Addition Add
Action Based Icons
   6. Payment Joux Diamond
   7. Discover/Search Events
   8. Invite Friends
   9. User Belt or Ribbon Status
   10. Memories
   11. Cash Out
   12. Trail
   13. Trail Suitable
   14. Download
   15. Upload
   16. Edit
Personal Profile Icons
   17. Your atom
   18. Your Rating
   19. Notifications
   20. Stats
   21. Block Days
   22. Radius
Main Toggle Icons
   23. Homepage Map
   24. GamePlan Icon
   25. ArmCandy Icon
   Internal Filter Icons
   Mood Gauge
   26. Active
   27. Relaxing
   28. People
   29. Surprise me
   External Filters
   Icebreaker Icons
   30. Would You
   31. Improve
   32. Hot or Cold
   33. Questions
   34. Never Have I Ever
   Switch on Off Icons
   35. Metered Date
   36. Date
   37. Solo Mode
   Communications
   38. Invitation
   39. Messages
   40. Friends
   41. Ally
   Indication
   42. Timeline
   43. Save
   44. Save email Additionally, the following Gameplan Icons may also be provided:
   1. Restaurant
   2. Cafe
   3. Movie/Theatre 4. ChillSpot
5. Recreation
6. Events (Tickets Required)
7. Group
8. Exposition
9. Lounges
10. Sports
11. Relax
12. Activity
13. Happening (Random Events) (User Organized Events)
14. Concerts
15. Nature (Hiking & Walking Trails)
16. Club/Party (Bottle Pop)
17. Monuments
18. Workout
19. Beach (party)
20. Extreme (Rock Climbing, Sky Diving, Motor X, At Your Own Risk)
21. X-Club (subscription) e.g. Muscle Car Club, Yoga Club Basketball Club etc.

All Icons displayed on the Homepage Map represent a potential interaction; icons within Homepage Map are accessible by tapping whereupon a larger more descriptive representation may ensue. The image of a Date Ally or Friend may be displayed within User radius; User Icons may be accompanied by button color values that indicate desired level of interaction, if pressed. By tapping Date, Friend or Ally Icon, a larger more descriptive representation may ensue. In the case of the potentiality of a Date in the Users Homepage Map, Dates can be added to a Users current Outing or User may initiate an interaction with Date and Outing concurrently tap button indicating level of interest. A User selects a Profile photo by taping the image once the User may be redirected to the present invention's Page where a larger version of the photo may be visible above Red, Yellow and Green blocks from left to right respectively. The Date's Name may be listed along with a points evaluation of how many points Users needs to invite Date to an Event and three small dots beneath the photo to browse the other two, preferably verified photographs by sliding a finger over them to switch between the three photos, Profile, Fullbody and Choice. If Date has a Meter, then a Gold written word "Meter" may be present in the Bottom corner. The User may then have the opportunity to just simply tap the color to rate the Date with their finger and image may 'swipe' in respective direction.

Herein follows an overview of the unique rating system. This is the revolutionary Red, Yellow, Green Light rating system unique to the present invention's System. The light system selections are incorporated into the User's Profile along with any collected patterns of usage regarding common interests of 'HEARTed' Events and Survey information, frequency of activity, and social circles to determine most suitable matches. By creating the 'light system'. The present invention's has introduced a revolutionary way to organize users' preferences with "yes" "maybe" and "no" as opposed to just "yes" and "no" which opens the platform for the system to combine aesthetic preferences with natural compatibility to create the most appealing scenario possible—rather than completely denying people (RED) you may share high compatibility with. If User has 80% shared preferences and interests with a Yellow Lit Date, then Yellow Lit Date may supersede Green Lit Date in GamePlan Date Reel Unless Green Lit Date is superior in compatibility to Yellow Lit Date ALSO. These preferences and interests are determined by events 'hearted', Location, Interests, Intake survey, additional surveys, and IceBreakers 'hearted' or answered similarly then the system filters the priority to the most compatible combination of desirability and interests.

If User selects the Genie Bottle Toggle in mid right corner of the Homepage MAP then Gameplan Icons may pop up allowing the User to filter different categories of events, Outings, and zones of interaction in city. If User is on Outing then, the User may be redirected to the Outings Page. The Outings Page is a verified photograph of an Event, displayed through a horizontal reel that displays the procession of events to be scrolled horizontally by dragging a finger over the screen. An indicator for time may be displayed below the horizontal procession of events. The upper two thirds of the Outings Page is the Interactive Map displaying Location of the Event determined by the present invention's Bluetooth location system, the Points required to attend the Event and at the bottom are "Check", "heart" and "X" icons to signify "attending", "like" and "dislike" respectively when tapped. The rating of events increases the information known about the User and the User's Profile System begins to Filter and Categorize with a better specificity for compatibility with other Users.

When a User Green or Yellow Lights a Date and/or Checks or Hearts an Event User is redirected to the Gameplan Page. The Gameplan page is two movie reels horizontally parallel across the screen above a third, smaller reel at the bottom. The top reel scrolls horizontally across by dragging a finger over the screen to display Events that have been 'Liked', 'Hearted' or Suggested by the present invention's filtering system. The bottom reel scrolls horizontally across by dragging a finger over the screen to display Profiles that have been Green or Yellow lit, depending on compatibility or Event selection. Next, User may drag and drop the Event(s) and Profile(s) into the Bottom "Final" Reel by pressing one's finger to the screen over the image of Event or Profile, and sliding the finger down to the slot on the bottom. As the images are added to the bottom reel the "Points" tab may increase respectively to the necessary points required for the selections. If User requires more points, then pop-up may signal the User to purchase more in order to finalize the Outing. If User selects multiple Dates for one Outing, Dates may receive Meters automatically.

A Meter is applied to any Date that has confirmed an invitation to an Outing with Multiple Dates or has High Point rating, Star Rating, Green Lights and qualifies for a Metered-Date Incentive Promotion. The meter allows for Dates to gain 10% of their Point Value for every hour of the date as opposed to gaining a base sum of points based on the point evaluation. If a metered Date confirms within 24 hours of the Invitation before the 2 hour cut off, then User may be charged a metered rate for the Duration of the Date unless the Date 'turns the meter off' in Profile Page at Dates discretion. Outings can be cancelled Prior to the 2 hour cut off in the Profile Page where a Cancel Toggle is located or If either Date or User is unsatisfied with the Outing can be Cancelled with Cancel Toggle in Profile Page to Leave Outing early, Points division and Reimbursement may be adjusted by the present invention after Ratings and Evaluations are completed The present invention's Ticketing Agency is significant in the Applications self-sufficient system as it aids in the Solo Mode, Promotional features, Incentive Rewards and a simple way to engage people in the present invention's System to gain compatibility and find people with common interests in trending Events. The present invention's system Groups and Categorizes the present invention's Network into compatible streams and promotes both trending Events and pre-filtered selections. Once an Outing is selected and Dropped into the Drag & Drop Zone then an invitation is sent to the Date(s) in the form of a Push Notification. The first Date to confirm within the appropriate time frame may be finalized in the GamePlan Reel should the User satisfy all expectations. If Date missed the Invitation Push notification then Date can find all Invites Above the Past Outings in the Past Outings tab in their Profile Page, Reminders may be sent as push notifications to User and Date, and The GamePlan Page may be converted into an Outing(s), Itinerary once Confirmation and Finalization is completed. Once Outing(s) have begun Appropriate Push Notifications may be initiated for connection assistance: IceBreakers and Safety: Check-ins, Outing Radius and possible dissatisfaction: Tardiness, Cancellations, Early finish. Upon Date completion Evaluations may be prompted via Push Notification to help the present invention's System reevaluate the Date or User's Profile, compatibility, relation to other the present invention's members, Incentive Rewards, Points, Point Rating, Star Rating, Promotions for either Date or Users to continue to develop the most personalized experience possible for the present invention's member by pre-establishing filters and respective categories.

SoloMode is the ability for a User to Purchase Tickets for Events shown in the Outings promotion of trending Events in the present invention's Application, Ticketing Agency in the present invention's HomePage. Promotional Events and Discounts are Ticketed Events or deals negotiated with any affiliated partnerships for present invention's Members to engage in the Incentive feedback loop for rewards and benefits.

Point Value may appreciate or depreciate as the present invention's User or Date remains active in the present invention's Network Depending on the Ratings. Any User or Date can cash in their points after the 500 mandatory/complimentary point balance whenever.

Herein follow details on the partnership proposal. The present disclosure provides a Social Enhancement application with revenue streams unlike any other dating app seeking partnerships with companies such as, ridesharing platforms, StubHub, BottlePop, and restoration.

As a result of these partnerships, users may have instant access to a wide variety of options to amplify the ArmCandy experience. These partnerships may establish the connections necessary to make ArmCandy more hospitable to the users by creating better access to numerous restaurants, nightclubs, lounges, bars and special events in the local area while offering incentive rewards and promotions to the User. The ArmCandy App has an intricate points system to encourage users to utilize these additional aspects and in return earn points back that can be translated to rewards and/or cash.

Partnerships with StubHub, BottlePop, Menu, and Uber may enable ArmCandy to create a mutually beneficial agreement to provide ArmCandy Users with the optimal experience and in return bring traffic to these companies.

Stubhub, BottlePop, and Uber may include open APIs which may facilitate integration of interfaces.

The present invention seeks these partnerships to be better equipped for users by having instant access to a wide variety of options to amplify the present invention's experience. These partnerships may establish the connections necessary to make the present invention more hospitable to the users by creating better access to numerous restaurants, nightclubs, lounges, bars and special events in the local area while offering incentive rewards and promotions to the User. The present invention's Application has an intricate points system to encourage users to utilize these additional aspects of the application and in return earn points back that can be translated to rewards or cash.

The present invention seeks partnerships to establish a solid foundation of connections within applications. To utilize and unify with other applications may create a lasting relationship with users, bring traffic to the applications, and secure a lasting foundation with these partnerships.

In the present invention a matchmaking system comprises of: a User Initial SignUp process, a Points System, a DNA Rating System, a Cancellation process, a Home Page Map, an Outings Page, a Shared Event Preference process, the present invention's main page, a set of Green/Yellow Light Properties, a set of Red Light Properties, a Meter process, a Helpful Hints GameCenter process, a GamePlan Page, a API UX, a Spending Gauge, a Belt-Level System, A GamePlan Icon Screen, a Location Radius process, a Profile Page process, an IceBreakers process, a Bluetooth Technology process, a Mapping process, a Calendar process, a Requests process, a Push Notifications process, a Solo Mode process, an All Percentages process, a Compatibility process, a Partnerships process, an Invitations process, and a Help process. In addition, there are optional hardware components, including a retrofit dongle, a customized phone case and an AC GNSS system which ties into many of the aforementioned components.

Notably, many of these components and processes are comprised of other subcomponents/sub-processes, which may be described in detail later this disclosure.

Figure 10:
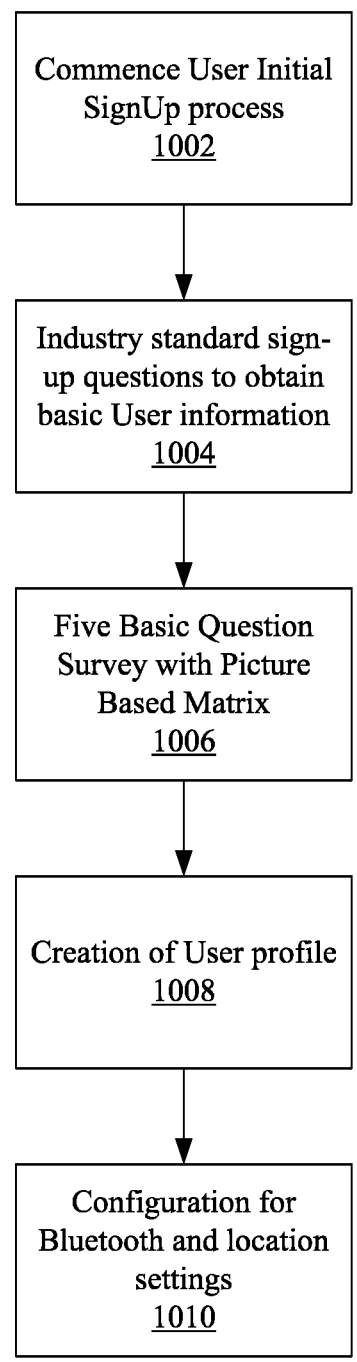
FIG. 10 illustrates a flowchart of a method 1000 of facilitating social networking based on events comprising a set-up phase, in accordance with some embodiments.

The first major component/process of the present disclosure provides the User Initial SignUp process. This is depicted in FIG. 10. The signup process commences at 1002. First, this process may ask standard sign-up questions (1004). Fields involved may include but are not limited to: First/Last Name, Gender, Date of Birth, Request for location services on Bluetooth, etc. The process may also request a Verified photograph of the User's face.

In the invention's preferred embodiment, there may also be A Five Basic Question Survey with A Picture Based Matrix of two rows of three displaying various pictures (stage 1006). These questions are set to determine basic preferences and personal characteristics of Users (stage 1008). There may be questions including but not limited to: "What would be your ideal date?" written above 6 pictures describing the possible answers such as a photograph of people dancing with "somewhere to dance" superimposed over the image. In the invention's preferred embodiment, this intake survey is 5 questions long and focuses on keeping the present invention's procedure simple and interactive.

The "User's Profile System" is a collection of information and patterns relevant to classifying and categorizing the User into certain groups of interest, likes, personality traits, and spending gauge.

The location settings and Bluetooth must be on to determine the appropriate radius for the present invention's Network to pull from (stage 1010).

Figure 8:
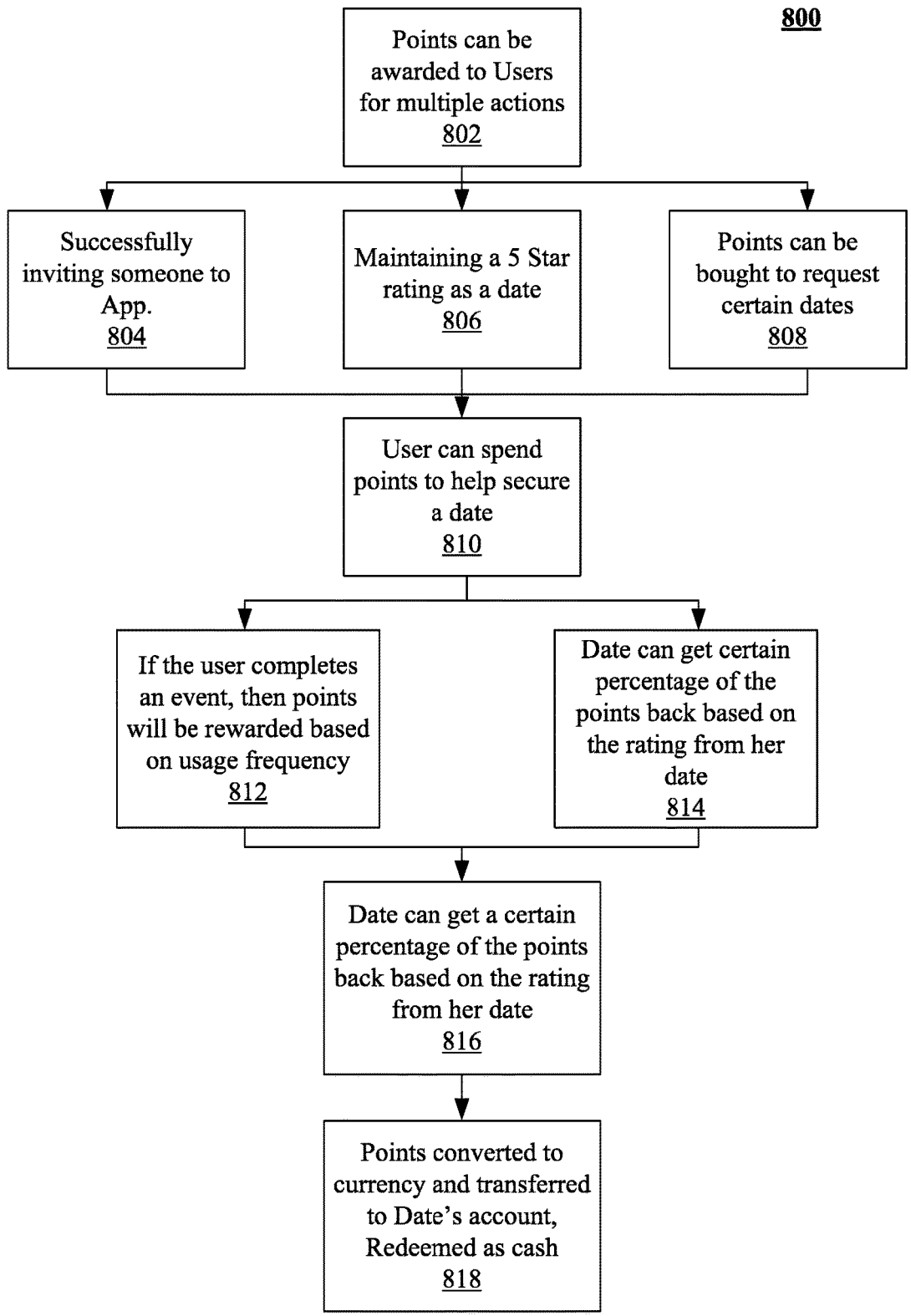
FIG. 8 illustrates a flowchart of a method 800 of facilitating social networking based on events comprising management of points associated with a user, in accordance with some embodiments.

A further component/process of the present disclosure provides the Points System process. This process provides one of the key unique functionalities of the present invention. This is depicted in FIG. 8.

Points can be awarded to Users for multiple actions (stage 802). These actions include but are not limited to:

Attending Events: If the User attends an Outing, a portion of points may be rewarded back to the User.

Successfully inviting someone to App (stage 804). This is worth 50 points in the invention's preferred embodiment.

Maintaining a 5 Star rating as a Date (stage 806). Quality is important and points may be rewarded to the Dates who get perfect ratings.

Using the platform's Partnerships. The present disclosure provides partnering with other companies to create a large Social Outings network with the ease of having everything arranged into a single application. If the User is utilizing the services offered through affiliated companies, then a portion of the points used may be rewarded.

Points can be bought to request certain Dates (stage 808). Subsequently, the User can spend the Points to help secure a Date (810). Points cannot be received by merely selecting a Date, for either the User or the User's Date.

No points are required to attend a Ticketed Event, because the present invention application has its own Ticketing Agency. The Ticketed Events can be bought on a monetary basis.

Each event is worth a different amount of points. Points can be returned to User based on Event & Outing expense. Users who regularly attend high caliber Events or choose 3 events per one Outing should never have to Purchase more points, unless User(s) are always attending Outings with 'Metered' Dates or multiple Dates simultaneously. This would increase the spending beyond the points rewarded credit.

High Caliber events or "complex" Outings, defined as 3 events or more, may award the User with more points. Then the User should not need to purchase more if the points awarded cancel out the additional points needed, i.e., if the Date is note metered, etc.

All Users start with '500' points upon signup. Points can be cashed in by Users & Date(s), as long as a balance of 500 points is maintained. Points are exchanged as 9.97 points for every unit of currency, or for every dollar 9.97 points; this entails there are 10.03 points for $1.00 on the exchange.

To reiterate, points can be 'cashed in' at any time so long as a 500-point balance remains. If the User selects a Date above Users' budgeted "point range," then more points must be bought in order to send Push Notification to Date in GamePlan. Push Notifications are sent to Date(s) by User by double tapping the picture of Date Reel in GamePlan. Notably, the budgeting filter includes Events and Dates 30% above the budget maximum.

If the User selects a Date within point range but does not have the points to satisfy the Date(s), then the User must 'pre-authorize' the total points needed to satisfy the Dates required points and the Meter. Notably, "Meter" only applies to Metered Dates within 30% of Users averaged spending. Should the Date accept, the additional points must be purchased by the User to finalize the Outing.

A popup notification may show up upon the Users' double-tap on the Dates' image in the Gameplan page. "Oops! [DATES NAME] meter is 559 points. Click ( ) to get more points for your date tonight!" Alternatively, the User can select a different date.

If the User completes an event, then points may be rewarded (stage 812). There are several results: Percentages of the total cost are rewarded to the User. Frequent Users get better rates. Users who create full 3 event Outings get better rates. Users who invite multiple Dates get better rates.

In addition, the following rules may be provided:
  IF User attends 1 Event per Outing THEN User recovers 2.5% of Points Spent ELSE unless Date is metered.
  IF User attends 2 Events per Outing THEN User recovers 5% of Points Spent ELSE unless Date is metered.
  IF User attends 3 Events per Outing THEN User recovers 7.5% of Points Spent ELSE unless Date is metered.
  IF User attends a Select Event or Outing THEN 10% of points spent are recovered ELSE Unless Dates are Metered.
  IF User attends 2 Select Events in One Outing THEN User recovers 12.5% of Points Spend ELSE Unless Date is Metered.
  IF User attends 3 Select Events in One Outing THEN 15% of Points Spent are recovered in Joux.

If Date engages in an event, then points may be awarded to the Date based on percentage of satisfaction (stage 814, 816).

Dates that receive a 5-star rating may receive 15% of points gained from Outing.

Herein follows the formula used in the invention's preferred embodiment:

$$\text{Points}*(0.15)=x \; x+\text{Points}=\text{Excellent Rating Bonus Points.}$$

Notably in terms of variable definition, "x" stands for Points recovered from User; these are not the actual amount of points. The process may perform a calculation of points and money spent. Events are $$. If Total Outings in the set of 3 or more are $500 then 300 points $300 for 3 Events=$330*0.15=49.5*0.10=495 Points.

Dates that receive a 4-star rating may receive 12% of points gained from Outing. The formula is: Points*(0.12)=x x+Points=Excellent Rating Bonus Points.

Dates that receive a 3-star rating may receive 9% of points gained from Outing. The formula is: Points*(0.09)=x x+Points=Excellent Rating Bonus Points.

Dates that receive a 2.5-star rating or less may receive 5% of points gained from Outing. The formula is: Points*(0.05)=x x+Points=Excellent Rating Bonus Points.

If User or Date would like to receive monetary exchange for points then Date or User can cash in Points in profile, otherwise the Date(s) can use points towards "checked" Ticketed Events. Points can be converted into an account transfer or a credit to credit card on file conversion exchanged. As mentioned, in the invention's preferred embodiment, this is $1.00 for every 9.97 points: 10.03 points for every $1.00 cashed in.

If Date cashes out points, then amount may be converted to currency and transferred to account (stage 818).

In the inventions' preferred embodiment, everyone may have a credit card on file verified through their Apple ID or similar service.

Metered Dates have the option to have a banking account set up and verified through secure online banking.

If Date utilizes points for events, then Date can attend event or Outing at a discounted Rate.

If Date receives Excellent averaged 5 star Ratings, then Date accumulates a higher percentage of Spending Gauge Outing points. This is shown in Point 9 above.

If the User requests a Date, then the points may not be taken until User clicks 'Finalize' in GamePlan and confirmation of that Outing is finalized in shopping cart.

If a User utilizes one of the partnerships available, then the User may automatically receive a minimum of 50 points.

The system must determine User from Date based on purchases, points spent vs. points cashed in, and points used to acquire Dates/Users, request for Outings vs. Invitations for Outings.

The Application does not ask at sign up whether you would like to be a User or a Date.

Rather, the User's Profile information combined with the patterns of usage and the present invention's Network system to determine whether the person is behaving like a User or a Date.

A User is someone who uses the present invention's Application to coordinate Outings with other individuals using the Application.

A Date is someone within the present invention's Network whom is more likely to be invited out via the present invention's Application, the Date must also satisfy the requirements of the lights grading system.

If someone who is currently classified as a User begins to get invited to events, with good ratings, then the User could become classified as a Date as well.

If the User receives 70% or more Green Lights, then User automatically becomes a Date, should User choose to become Date.

If User receives 60% or more Invitations request for Outings, then User sends out via Push Notification and has 60% Green Lights then User becomes a Date.

If User has 60% Green Lights and successfully invites at least 10 people to the application, User becomes Date.

If User has 50% Green Lights and receives 20 or more invitations per week, User becomes Date.

If User has accepted an Invitation Outing Request and other User Finalize then User automatically becomes A Date for 24 hr Cycle.

If a User is invited to an Outing via the Arm Candy Application and Accept, then User becomes a Date and for the duration of the Outing application, may no longer send notifications specific to Users. As an exception, there may be Specials etc. or other forms of notifications still sent.

Any Date confirmed to attend an Outing(s) may be kept "unavailable" for the duration of the Outing(s), and as a result may disappear from the network of Dates for 2 hours prior to first event and 1 hour after the last event.

Also, any User Attending an Outing(s) as a Date may have their account converted to stop "promoting for Users" for the duration of the Outing(s).

Anyone who is extended the offer to go to an Outing with a User has the ability to Decline, whether currently classified as a Date or a User.

The three classifications, User, Date, Metered Date, are correct but there is plenty of room for lateral movement should the individual satisfy the requirements to be in the category of consideration.

If User receives 90% more points than User Spends, excluding reward system for attending events, then User automatically becomes a Metered Date.

If Date Red Lit User then Date may only show up In User(s) Date Reel, if Users' Spending Gauge is 30% more than what Date typically earns in Points or if User has 90% compatibility or more.

If Date is inactive 14 consecutive 24 hr Outing cycles or 14 days, then Dates points request value, points required for User(s) to finalize with Date, depreciates not points accumulated by 10% loop.

Inviting multiple girls out at once guarantees each of them a meter whether the Date(s) are usually a metered date or not. If a Date is usually a Metered Date, then Date does not earn a higher percentage because they are regularly on a meter.

If a User becomes a Metered Date then the Date must attend one Outing a week, have 65% Green Lights or more, have a rating 3 stars or above, 5 Green Lights per date, and have 3 or more invitation request per 24 hr cycle. This is unless accepted one of the first two requests, then the Date can retain the 'metered' status.

A further component/process of the present disclosure provides the DNA Rating System. Notably, ratings are not visible to the general public, only to the individual User in profile page. Date's ratings are the basis of how much a date earns from Outings.

Each Star is equivalent to 20%, thus 5 stars=100%. Everything is on a weighted scale. It may be helpful to think of each Outing as a class, factoring into GPA. Fields may include but are not limited to: timeliness, response to invitation, percentage of responses to invitations, and percentage of responses to invitations is equivalent to class attendance in school which factors into one big equation.

Every Rating is illustrated by a 1-5 Star system per each category. There are 4 Categories for User(s) Rating Date(s) which are: Respect, Kindness, Loyalty, and Attentiveness. Alternative or future embodiments of the present invention may include other categories not explicitly listed here.

There are two Categories for Dates rating Users which are: Respectfulness, and Generosity.

There are no categories for Venues, Partnerships; there are just 1-5 Star Pop up i.e. Rate Venue.

If a Date receives Excellent and Superb 5 Star Rating from User, then Date earns a higher percentage of Spending Gauge.

If a Date averages 5 stars in all categories during an Outing then Date receives 15% of total preset Spending Gauge averaged with current Rating and Push Notification sent, Ex. "[USERS NAME] enjoyed the Outing".

If a Date averages 4 stars in all categories during an Outing, then Date receives 12% of preset Spending Gauge averaged with current Rating.

If a Date averages 3 stars in all categories during an Outing, then Date receives 9% of total preset Spending Gauge averaged with current Rating.

If a Date averages 2.5 or more stars in all categories during an Outing, then the Date receives 7% of total preset Spending Gauge averaged with current Rating.

If Date receives Inferior to 2.5 average stars, then Date receives 5% of total preset Spending Gauge and Push Notification is sent, Ex. "Uh-Oh you received a Low Rating".

Users & Dates may experience Rating Pop Up each time application is opened and may need to Rate for any further usage.

Date's Outing Ratings are averaged with Date's current Rating to determine point request value for future requests.

Dates can Increase their average Rating per the present invention's Application independent of Users by 2.5% (of Star Rating Scale) every time Date is on time. Date may be informed via Push Notification that Date has the option to increase their rating, an hour before first Outing, and on the 1st, 3rd, 6th, 12th, 24th, Outing, and every 6th Outing After.

Remind Date of the Outing 2 hours before first event. If Date is late send push notification prompting an "expected time of arrival" sliding meter above a "cancel" button.

If Date Cancels any later than 2 hours prior to the start of the first event, then the Date may drop in ratings. In the invention's preferred embodiment, two hours is the cut-off time for confirmation and cancellation without repercussion.

Push notification when User or Date arrives and prompts other for ETA. If ETA is reached and a no-show occurs, another ETA prompt is sent.

If 'Metered' Date accepts 33% of Invitation Requests from Users, then Date can Boost Ratings per the present invention's Application By 20% Averaged with Past Ratings.

If a metered Date is actively accepting at least ⅓ of invitations being sent, then the process may increase Date's ratings by the average of the past ratings with the current ratings by 20%. This is the average past ratings with current ratings increased by 20%.

If Date accepts 33% of Invitation Requests Date Receives from Users Date, can Boost Ratings per the present invention's Application By 20% Averaged with Past Ratings.

If Date is actively accepting at least ⅓ of invitations being sent, then may increase their ratings by the average of the past ratings with the current ratings by 20%. This is the average past ratings with current ratings increased by 20%.

If Date has 3 Consecutive Outings with Low Ratings, Less Than 2.5 averaged Star Ratings, then move to back of Dating pool queue and Date requires 10% less points loop.

Date may be at the end of the Dating Queue within the application. This is basically the back of the line of available Dates.

If Date receives frequent requests for Outings, then Date acquires 'meter' in the form of the present invention's logo in Gold signifying 'meter'.

If Metered Date has averaged rating below 3 stars and less than 5 Invitations per 24 hr Outing Cycle, then automatically remove meter.

Dates can increase their average Rating by 5% per the present invention's Application by accepting User within 5 mins of the initial Push Notification from User to Date. The Date may be informed via Push Notification that Date has option to increase their rating by responding promptly.

When User is leaving a venue during Outing, then User can Rate the Venue with 1-5 stars via Pop up.

Else User does not rate each venue during the Outing then User may be prompted via Pop up notification to rate all Venues visited throughout the Outing. There is a 30 min delay before the Rating pops up after Outing has ended else next time application is opened.

If User is unable to rate the Venues at the time of the Pop up then User may be prompted to do so Next Time User Opens Application, before other use of Application. Display in the form of an Itinerary Receipt with all venue(s) and Date(s) is to be evaluated.

If User is leaving last Outing then User can rate Date Based on 4 categories via Pop Up, 30 mins after. User must Rate Date Next Time User Opens Application before any other use of application.

If User cancels Date while on Outing, Leaves Outing Early, then User may Rate Date based on 4 categories: Respect, Kindness, Loyalty, Attentiveness. Alternative or future embodiments of the invention may utilize other categories not explicitly listed here.

If Date Cancels while on Outing with User, leaves Outing Early, then DNA Rating System Pops up and must be answered Before Date can cancel.

If Date has 3 Consecutive Outings with Low Ratings Less Than 2.5 averaged Star Ratings, then move to back of Dating pool queue and Date requires 10% less points loop.

Dating Pool Queue, field which states the filtered line-up of profiles best matched to the User. If the Date is sent back in the Dating Pool Queue it means that Date, then moves to the back of the line of available Dates.

If Date gets cancelled by Users during back-to-back Outings, Twice, then point value is decreased by 10% and Rating Decreased by 10% loop.

If Date is leaving last Outing and did not cancel then Date rates User on 1-5 stars based on two categories: Respectfulness, and Generosity.

30 mins after Date leaves Last Outing, if Date does not respond to Pop Up then Date must Rate User, next Time Date opens Application.

If Outings exceeds or equals 7, then DNA Rating System is activated. DNA Rating System is utilized but does not go into effect until 7 Outings.

DNA Rating system is highly personalized based on the data recorded throughout the duration of time it took the User to get to the 8th Outing. It is the point where suggestions and filtering may become more automated, such as Netflix movie selections.

If after 10 dates User rates at least 70% of Dates 1.5 stars less than Dates average rating, then User is prompted to email the present invention's managing authority to tell us what's wrong.

A further component/process of the present disclosure provides the Cancellation process. If Date cancels before the Outing is over, then Spending Gauge earnings are forfeited and half the points are deducted.

If a User cancels 15 minutes after Finalized Outing was scheduled to begin due to fault of Date i.e. because of no show or Tardiness, defined as being 15+ minutes late, then send additional Push Notifications via Pop Ups allowing User(s) to communicate without chatting, i.e. "[DATES NAME] is on her way and may be there in (15) mins (5-45 mins sliding scale adjustable by User or Date in Push Notification)."

2.5% of Users and Dates general points are deducted for Tardiness and Rating decreased by 5% and Date is less visible in Dating Pool.

If User cancels on Date after 'Finalize' prior to first Outing, then points required to accumulate Date are forwarded to Date and Date is again visible in Dating Pool and can accept Invitations from other Users.

If a User cancels, then there is no refund of events already attended, but the events later can be refunded depending on partnership agreements.

When on an Outing the Game Plan page may become your current date. Therefore, it may show the Date you are with, the Outings with the times attending, the presumed spending gauge, the amount of points used and CANCEL OUTING, CANCEL DATE.

Cancel Outing—may be if you do not want to go to that location anymore, or want to end the night early.

Cancel Date—may be if you do not like the Date and aren't enjoying the evening and want to stop.

If a User cancels because of their Date during Outing, then User can only be refunded half the points used to acquire Date and User may receive Push Notification Pop Up asking if User wants another Date (Display Dates In Pop Up) and send Push Notification to All Dates User Double Taps in Pop-up. First Date to Accept replaces annulled Date.

If User wants to go out with another Date then User sees Display Options for night Out in Pop Up, Nearby Date in Location within the radius in HomePage Map or GamePlan. If Date accepts User in Push Notification Pop Up or double taps User in GamePlan Date Reel then send Push Notification to both User and Date setting meet location or Uber Pick up location. Meeting location is User's current location or next scheduled location If not changed in Gameplan.

If User requests another Date after cancellation Date, then send Location Based Push Notifications to nearby Dates prioritize User Request in Dating Pool and reduce points cost for next Date(s) by 20% to replace User(s) annulled Date.

If Dates responds OnDemand then Dates may receive 20% of Spending Gauge averaged out with current Rating and Rating on Date.

The present invention may absorb the missing profit to ensure that the User enjoys the Outings with a new Date and the new Date may receive a 20% increase in Rating averaged with past rating.

Dates may always receive a higher percentage of Spending Gauge & Points, based on response Time and acceptance rate of User Invitation Request.

A further component/process of the present disclosure provides HomePage Map process. If User has yet to satisfy the present invention's Red, Yellow, Green Light System, then Populate Events in HomePage Map based upon User. Factors include but are not limited to: Intake Survey, Location and Display Dates Based on Past Invitation Acceptance, Availability, online Status of Dates, 'Hearted' Events, 'Checked' Events, and Attended Outings. Notably, all of the information collected about the User is applied to the Filters within the present invention's system.

If User has yet to satisfy the Outings Page, then the process may populate the HomePage Map based on factors including but not limited to: Location, Intake Survey, trending events based on Location, Select Events, Belt-Level.

If the User clicks on an Event which the User still has no heart, then the User can click on the Event, then go to Outings Page to a preview of the Event.

The Outing (s) if checked, it may appear in Events Reel in Gameplan.

The User can enter solo mode if wanted.

If User or Date heart or check an Outing, then encouraged, but not required to take any action to Green or Yellow light the date.

In HomePage Map, Events/Iconic Language take Display precedence over Dates in the Homepage Filtering system.

Dates are displayed next to an Event a Date has 'hearted' or 'checked' in Users HomePage Map. If multiple Dates, 'hearted' or 'checked' an event, then populate based on compatibility and other filter mechanisms.

Events appear in Users Homepage Map based on interests, location and trending events with compatibility to the User's Profile System.

If Date 'Hearted' or 'Checked' Event, then display Date in User(s) HomePage Map next to event.

Certain trending events are prioritized based upon partnership agreements. Must be an open ended system to promote affiliated partners and ticketed events available in the present invention's Ticketing Agency.

The present invention's ticketing: In events page, if a ticketed event is selected the toggles to scroll down may be selected for "section" and "number of tickets".

Seat options may be generated and those available may appear in a third scroll down toggle, i.e. section 3 and 2 tickets could generate options in third scroll such as 3Aa+3Ab $210.00–3Ff+3Fg $180.00 etc.

SEATMAP may be accessible where the map is typically displayed over all events, in Outings Page and can be panned and viewed as the regular map does, then if User clicks on the upper map area, then map may enlarge as it does to Pan in regular Outings listings two dots may appear below the image to switch from external map to internal map.

EXTERNAL MAP is the location map provided in Outings Page for all events whether ticketed or not.

INTERNAL MAP is the seating chart for any Events requiring seating selection.

The present invention may also have a Website for the Ticketing Agency to operate out of. If a Ticketed Event is selected, then User may be redirected to the present invention's Ticketing Agency to proceed with the purchase of the Ticketed Event.

The present invention's Ticketing Agency Website is also for Direct purchase without needing full the present invention's arrangements such as in Solo Mode.

Emails can be sent to Users/Dates to promote Trending Events, Ticketed Events, Select Events, Promotions and Discounts with hyperlinks to open the app directly to the Gameplan page with the promoted event in the primary of the event reel.

Date's Home Page may be populated with various factors, including but not limited to: Users that Date Green Lit in the present invention's page, Users with hearted similar events, User(s) that Date(s) accepted but did not 'Finalize' with in time first Date to confirm is awarded the Outing.

Users that meet 60% or more compatibility requirements.

If a User or a Date Green Lights or Yellow Lights each other with 60% compatibility or more then both are more likely to show up in each others' HomePage Map contingent upon location radius.

If User clicks on Date in HomePage Map and User has Satisfied the Green Yellow Red Light System buttons adjacent to image icon of Date and clicks add Button adjacent to icon representation image of date picture of date, then User can Add Date to current Outing. If User clicks on Green Yellow Red Light System, then bypass the present invention's ArmCandy Page and send direct to GamePlan.

The Homepage Map is populated by a series of profiles, venues, events, and interactive zones that show compatibility with the User's desires and preferences, concluded by the ratings the User awards to certain Dates or Outings, and the User's pattern of activity as concluded by the ratings of Past events, Date evaluations, Spending gauge, Type of event etc.

Friends & Allies

In an instance, within the Soul-Phi Radius, a User can have up to 3 friends and 6 allies. Further, friends may be visible within the city if they are online. Moreover, Users may have the option to add everyone as an ally first then after parameters have been satisfied, they may become a friend. Allies are temporary and can fall out of the User's radius. For example, a member of the User's basketball team may be considered and further reflectively allies may be added during a group activity or participant interaction. Further, Users may give a global rating to allies during competitive matches, activities, and group or community events.

IF Ally has been Ally for three consecutive months to User THEN prompt option to add to friends. IF User wants to add friend as already has 3 THEN User must remove friend. Further, User has option to add User As Ally after rating User. IF User is traveling then friends and allies can convert to respective territory. IF the User rates an Ally THEN Ally can see ratings in memories but not specific just lines. Friends and allies use matching software. Accordingly, IF User and User both adds each another THEN add to allies. IF User and User link up within the month they remain an Ally. IF User and User link up more than 3 times within a month User has option to add Ally to friend. IF User and User have 90% or more common interest THEN prompt option to add as Ally after rating. IF friendliest is full THEN prompt User to remove User. IF User gives ally under a rating under 2.5, automatically remove from allies.

Further, filtration of Users may be performed based on one or more of the following factors:
a. Age
b. Location
c. Gender
d. Sexual Orientation
e. Intake Survey
f. Mood Gauge
g. Filter Button (genie lamp)
h. Gameplan Icons
i. IceBreakers
j. Zones
k. Proximity
l. Compatibility
m. Shared Event Preference
n. Belt-Level
o. Ribbon/Bowtie Degree
p. Ratings
q. Block Days
r. Allies
s. Friends Link-Up User(s) can invite Date(s) on Outings; on the other hand, User(s) Link-up with other User(s) at the Outing or event location. This may render a User an Ally for the duration of the interaction, or beyond IF User adds User to Allies THEN display User in Soul-Phi Radius Joux can be exchanged between users and allies and allies can split payments of certain Outings or exchange Joux.

A further component/process of the present disclosure provides the Outings Page. If User has 'hearted' 10% of Events listed in Homepage Map via the Outings Page Rating System, then Gameplan Toggle is illuminated.

Figure 9:
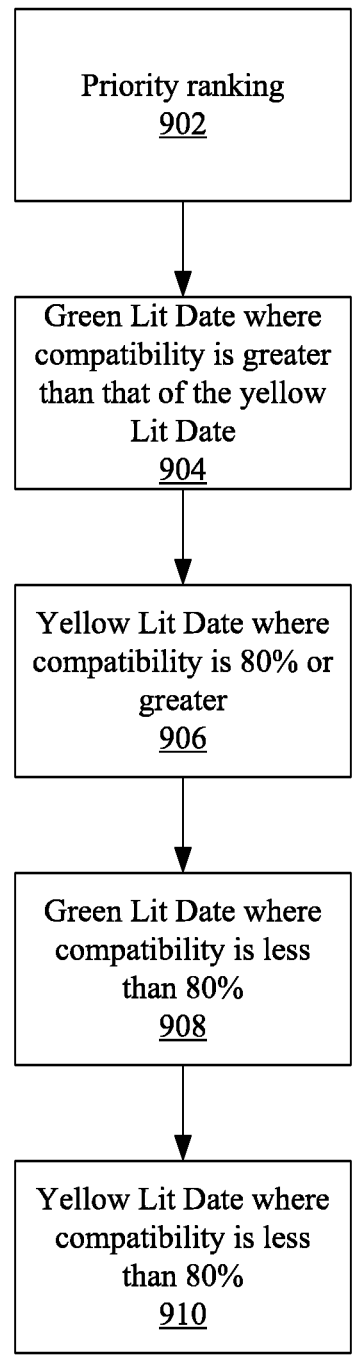
FIG. 9 illustrates a flowchart of a method 900 of facilitating social networking based on events comprising prioritization of dates using compatibility, in accordance with some embodiments.

If User has similar interest expressed in 70% or more 'hearted' or 'checked' events comparable to Date(s) in Dating Pool, then potential Date(s) may be prioritized in Users HomePage Map. Alternative or future embodiments of the invention may have different cutoff points. One possible embodiment is depicted in FIG. 9.

If Date 'hearts' events in Outings Page, then Dates are visible next to events in Users HomePage Map.

To make it easy for User's to know which Dates want to go to certain Events.

If User has 'checked' represents attending more than three events Chronologically Synchronized in the Outings Page within a 24 hr cycle, then pop up for GamePlan is prompted. Users are directed to Event Reel.

User can select three separate Events to comprise a single Outing so long as the selected Events are not of the same time frame. The Events must be listed in proper chronological order in order to finalize.

If Events are for different 24 hours periods then may not appear in the Gameplan together, i.e., Friday night lounge and Saturday night club table.

If a Date is compatible with User by 70% or more based on multiple factors including but not limited to: Location, 'Hearted' & 'Checked' events In Outings, IceBreaker Consumption, IceBreaker Interaction, Belt-Level, Trails Created or Rated, Points Available, Events Attended, User Survey, Date has Minimum Rating of 3 Stars on DNA Rating Scale, Date clicks 'Check' on any event in Outings Page, then send Push Notification to all Users nearby who Green or Yellow lit Date and meet compatibility percentage. "Do you want to take '[DATES NAME]' out?"

If a Date wants to go to a particular Event on a certain day then select the 'Check' in the Outings Page to send a Push Notification to all Users who match the appropriate compatibility criteria, including the price range with an overhead of a 30% variable increase.

If a Date is compatible with User by 60% or more based on multiple factors, including but not limited to: Location, 'Hearted' & 'Checked' events In Outings, IceBreaker Consumption, IceBreaker Interaction, Points Available, Events Attended, User Survey, Gameplan Icon Interaction, Belt-Level, Trail Interaction, Spending Gauge, Date has Minimum Rating of 3 Stars on DNA Rating Scale, Date clicks 'Check' on any event User HEARTed or CHECKed in Outings Page, then send Push Notification to all Users nearby who Green lit the Date and meet compatibility percentage. "Do you want to take '[DATES NAME]' out?"

If Date is compatible with User by 60% or more based on factors including but not limited to: Location, 'Hearted' & 'Checked' events In Outings, IceBreaker Consumption, IceBreaker Interaction, Points Available, Events Attended, User Survey, Gameplan Icon Interaction, Belt-Level, Trail Interaction, Spending Gauge, Date has Minimum Rating of 3.5 Stars on DNA Rating Scale. Date clicks 'Check' on a Select Event which is trending, then send Push Notification to all Users nearby who Green lit the Date and meet compatibility percentage. "Do you want to take '[DATES NAME]' to ( ) Event?"

If User clicks Accept, then take to GamePlan for Finalize and bypass Drag & Drop.

If Date accepts Push Notification Pop Up, which looks like a classy invitation with Who, What, Where, When, How much, then Date's GamePlan Date Reel invitations are visible one by one.

If Invitation is sent to Date and no response has come from Date prior to the 2 hour Cut off time, then the Gameplan is ready to send NEW invitations to New Dates.

The User may be prompted to send for replacement Dates with high response rate timing for a Last Minute Date request.

If the original Date responds and confirms BEFORE any replacement Dates have responded then original Date can attend, or If User doesn't send invitations to anyone else and original Date responds then User can take original Date out.

If Original Date 'gets the Outing' after the 2-hour time cut off then "late Date" consequences, to encourage prompt responses in the future.

If Outing is a Last Minute Outing there must be 30 min notice and the window for tardiness is relaxed.

If Date establishes GamePlan then it may Display Picture of User, one User at a time, Users Spending Gauge, & Events to be Attended with User. If Date has not already accepted Users Invitation Request in Push Notification Invitation, then Date can double tap User's image to accept.

If Date goes to Gameplan page Date can click all photos to go to their respective pages If User has requested an Outing with Date, it may be displayed IN GAMEPLAN.

Herein follow the steps for the user. Put border around the photos or Shade or fade the photos to 40% opacity to prompt the Date to select their photo to see the invite, or have a notification board accessible by the little number bubble, akin to Apple notification signals, in the upper left section of the screen or have invites posted in the Dates profile page and have the profile toggle illuminated when there are invites unanswered to prompt them to go and check the invites in their profile page, Listed above past Outings, in the Past Outings tab.

The General Operating Statistic for Compatibility is 60%.

If Users want to go out with multiple Dates, then User must Request Group Outing and Dates Accept 'Group Outing'. If Dates accept Group Outing, then Dates automatically receive 'meters' in Group Outing.

If a User wants multiple dates for an Outing then Group Outing, all going out as a group.

All those requested to attend the group Outing may receive invitations as usual for Basic Dates the difference may be that Dates may be informed that this is going to be a group Outing and that Dates may be placed on a Meter, which is mandatory for all group dates, to ensure the cost of the evening is covered appropriately.

Herein follow descriptions of changes to normal procedure: every date is on a meter and every date is notified that it may be a group Outing before then agree to attend. All other details of the invitation/gameplan process remain unchanged.

It's easier to think of GamePlan as a proposition and interactive event planner. If User(s) selects Event(s) & Date(s) by double tapping which Event(s) Users would like to propose to Date(s) in Event Reel and Users double tap Date(s) in Date Reel then send Date(s) Push Notifications.

If Date does not accept invitation request from User within 24 hrs then Date(s) disappear from Users GamePlan Date Reel. Users can book no further in advance than 7 days.

Select Events bought through the present invention's Ticketing Agency are not bought with points therefore the Tickets CAN be bought further in advance. If the User buys Tickets to an Event further in advance than 7 days, then User may have to wait to make arrangements for that Event.

If Date does not accept invitation request within 2 hours of the first event with 24 hr cycle, then Date(s) disappears from Users GamePlan Date Reel. Unless User is booking within 2 hours of first Event and Event is time sensitive.

Dates must confirm attendance before the 2 hour mark prior to the start of the first event in the Outing(s). Prompt responses receive incentive rewards and a lack of responses, 10 in a row may push the Date to the bottom of the Dating pool within the present invention's Network System.

User(s) cannot book event without adequate half hour time buffer unless Date is already attending event. Else User inputs ETA, i.e., User inputs ETA for all day festival, club Outing, etc. If User Drag & Drops accepted Date(s) into Drag & Drop Zone, then Illuminate 'Finalize' in Green.

If User wants Select Event then User can buy tickets before confirming Date to avoid ticket sell out.

If User confirms purchase after clicking finalize then processes in shopping cart.

If purchase is confirmed by User, then Push Notification invitation is Pushed to all parties displaying Outing.

If Date receives requests for Outings too frequently then Date acquires 'meter' in the form the present invention's logo in Gold signifying 'meter'.

User(s) must check enough venues or events to have 3 Event Outings that are chronologically sound within 24 hr cycle. Users can pick 2 or 1 events to attend but Application always prioritizes 3 illustrated through points recuperated.

If User clicks the check in Outings Page At least 3 Outings that chronologically synchronize then Illuminate GamePlan Toggle.

If events do not chronologically synchronize then Error message for conflicting event times appears.

The 'perfect User' may have 3 events in their timeline. Each event has to occupy a different time slot than the others, i.e., ChillSpot, Concert, Club.

If a User only wants to book Dinner for their Outing that is fine. The App may promote more events in accordance with Users Mood Gauge, Dates, Friends, Allies, and Gameplan Icons interaction within Homepage Map; for a more complete experience the app may prompt to user to "complete the Outing".

Promotion of more events and Tips and Hints to help secure the perfect Outings for every User of the present invention.

A further component/process of the present disclosure provides the Shared Event Preference process. If Users 'heart' or 'attend' same events, then this may show correlation of interests through a Supporting Filter.

If Users 'heart' the same IceBreakers, then this may show a correlation of interests. Through a Supporting Filter.

If Users have the same frequency and pattern of application use, then this may show correlation of interests.

A Priority Filter is also utilized. If User & Date(s) Rate Venues in similar patterns, then this shows correlation of interest.

If User shares 70% or more compatibility with Date(s) then Date(s) become prioritized and a Yellow Lit Date can supersede A Green Lit Date in GamePlan Page.

Higher Compatibility may take precedence over a yellow light rating thus bumping it up to an equal color priority of that of a Green Light prior to compatibility assessment.

If Date 'Checked' an Event in Outings Page that Date would like to attend then Users that ALSO 'Checked' that Event may be sent a push notification to advise that the User take Date out to that Event.

If User Green lights a Date and Date has NEVER Green, Yellow, or Red Lit User then Date appears in Users Homepage MAP.

If User & Date have at least 60% similar interests, Similar HEARTed Outings, Compatible Intake Survey Preferences and Compatible patterns of Use as determined by the information collected in the present invention's Network System then filtered into precedence on Homepage Map.

A further component/process of the present disclosure provides the present invention's main page. If User exhausts the Dating Pool in Green/Yellow Light System, then Send To GamePlan to refine search or finalize Events and Dates.

If User selects Red, then the button may illuminate and the image may swipe left.

If User selects Yellow, then the button may illuminate and the image may swipe down.

If User selects Green, then the button may illuminate and the image may swipe right.

If User or Date has a 'Meter' then it is displayed by the present invention's logo in Gold in bottom right corner of the present invention's Page.

If Date requires more points than User has then display Dates no more than 30% out of Users averaged Spending Gauge interaction.

If User has no previous Outings, then send to GamePlan to adjust Spending Gauge.

If User is a Date, then Date can only RED light 10% of the Dating Pool.

If Date maxes out of RED lights, then POP UP may appear "I'm sorry, you've exceeded maximum amount of RED lights for the Day."

If a Date is Metered, then Date can only RED light 25% of the Dating pool. If User maxes out of RED lights, then POP UP may appear "I'm sorry, you've exceeded maximum amount of RED lights for the Day."

If a Date has 25% of the Red Lights remaining, then a POP UP may appear.

Percentage compatibility displayed in bottom left corner of Date the present invention's Page in reference to the User.

Percentage compatibility displayed in bottom left corner of User the present invention's Page in reference to the Date.

A further component/process of the present disclosure provides the set of Green/Yellow Light Properties as illustrated in FIG. 9. If User Green or Yellow lights Date(s), then Date(s) may appear in GamePlan. Ordered by compatibility based on User's Profile cross referenced with the present invention's Network System. Factors include but are not limited to: Ratings, IceBreaker Usage, Location, Average Outing Request, Acceptance Response Time, Events Date HEARTed, CHECKed Events.

If User has 80% shared preferences and interests with a Yellow Lit Date then Yellow Lit Date may supersede Green Lit Date in GamePlan Date Reel unless, Green Lit Date is superior in compatibility (Over 80%) to Yellow Lit.

These preferences and interests are determined by User's Profile cross referenced with the present invention's Network System, comparing factors including but not limited to: Events HEARTed, Location, Interests, Intake survey, IceBreakers 'hearted' or answered similarly.

If a User receives a substantial amount of Red lights 65% or more from the general community and User has NOT purchased an Outing, then User may Filtered to the bottom of the present invention's Network Dating pool.

If User receives 80% Red Lights, then User may be invisible to Dating Pool unless User purchases points or Outings Once A Month.

This does not take effect until after the User's first two weeks as the first fourteen days are considered 'probation' for learning and the repercussions for inactivity may not be administered immediately.

If a User receives a substantial amount of Green lights (85%) from the general community in a short amount of time, and Requests for Outings then the User may become a Date.

Any User can become a Date should User satisfy the necessary requirements.

If a User and Date Green Light or Yellow Lights the other, then both are more likely to show up in each other's HomePage.

If User Green Lit 25 Date(s) or has 60% compatibility with 10 Dates, then Illuminate GamePlan toggle.

If User Green lights a Date and Date Green Lights User, then Date automatically appear in User's GamePlan.

If User & Date have at least 60% Compatibility as determined by cross-referencing the User's Profile and the present invention's Network System and Date has Green Lit the User, then prompt the User to rate the Date. If the User rates the Date Green, display in Date Reel.

If User & Date have at least 60% Compatibility as determined by cross-referencing the User's Profile and the present invention's Network System and User has Green Lit Date, then prompt Date to rate User. If Date rates User Green, display in Date Reel.

If User & Date have at least 70% Compatibility as determined by cross-referencing the User's Profile and the present invention's Network System and Date has Yellow or Green Lit the User, then prompt the User to rate the Date. If the User rates the Date Yellow or Green, display in Date Reel.

If User & Date have at least 70% Compatibility as determined by cross-referencing the User's Profile and the present invention's Network System and User has Yellow or Green Lit Date, then prompt Date to rate User. If Date rates User Yellow or Green, display in Date Reel.

If User has Yellow Lit Date, then Display Date if similarities are 70% or more.

No Users may ever know whether another User or Date has Green or Yellow Lit them. If User double taps picture on Date Reel to send Push Notification to Date, then the Date can assume he or she was not Red Lit.

A further component/process of the present disclosure provides the set of Red Light Properties. If User receives 65% Red Lights, then push Word Based Question Surveys every 25 Green Lights given and encourage reading Helpful Hints & taking more Surveys to increase compatibility.

If User receives 50% Red Lights then push Word Based Question Surveys every 50 Green Lights given and encourage reading Helpful Hints, interacting with Game center Video Mentor Content & taking more Surveys to increase compatibility.

If User is a Date, then Date can only RED light 10% of the Dating Pool.

If Date maxes out of RED lights, then pop up may appear "I'm sorry, you've exceeded maximum amount of RED lights for the Day."

If a Date is Metered, then Date can only RED light 25% of the Dating pool. If User maxes out of RED lights, then POP UP may appear "I'm sorry, you've exceeded maximum amount of RED lights for the Day."

If a Date has 25% of the Red Lights remaining, then a pop up may appear.

If a User who is Red Lit by a potential Date Plans an Outing that is set at 30% superior to what A Date typically averages in points, then User bypasses Red Light function.

If User is Red Lit by a potential 'Metered' Date Plans an Outing 40% superior to what A Date typically earns in points, then The User bypasses Red Light function.

If User is Red Lit by potential Date and is 90% compatible, then bypass Red Light function.

In an exemplary scenario, as illustrated in FIG. 9, priority ranking (stage 902) may be performed. Based on the ranking, different lighting may be rendered for dates. For example, the application may Green Lit Date where compatibility is greater than that of the Yellow lit Date (stage 904). Further, the application may Yellow Lit Date where compatibility is 80% or greater (stage 906). Furthermore, the application may Green Lit Date where compatibility is less than 80% (stage 908). Additionally, the application may Yellow Lit Date where compatibility is less than 80% (stage 910).

A further component/process of the present disclosure provides the Meter process. If a Date receives 80% Green Lights from the general community, then 'Meter' is automatically put on Date.

Date must maintain at least 3.0 star averaged User Rating to sustain 'Meter' and Maintain at least 3 invitation request per Online 24 hr cycle.

Meter is based on the population and frequency of Request

Also 3 invitation requests and 5 green lights depending on population of location Must be open Ended to appease population variable If Date does not attend 1 Outing for every 100 invitations, then remove 'Meter'.

If Date does not attend 1 Outing for every 50 invitations, then make Date 100% less visible in Dating Pool LOOP.

If Date does not attend 1 Outing for every 25 Invitations, then reduce Point Value by 25%.

Additional pop up "Uh-Oh We've noticed you have had a lot of requests but have not been accepting any, is everything okay?"

If Date moves outside of Bluetooth Radius, then meter is suspended until Date returns and starts again 2 mins after Date Returns into Bluetooth Radius of User and meter restart time doubles every time Date leaves Radius.

To ensure that the Date is present for the Events of the Outing.

If the metered Date wants to take the User off the meter then this can be done at any point by going to Profile—Settings—Meter by swiping the tab, or can be removed in Gameplan.

Meter represents a certain amount of points being drafted from User per hour and each Outing, within specified time-cycle.

Meter is determined 10% of Date(s) Point Value averaged with the total Outing(s) used to secure Date hourly.

If 'metered' Date removes 'meter' during date, then send Push Notification to User Stating "[DATES NAME]" is enjoying her evening!"

A further component/process of the present disclosure provides the Helpful Hints process. Before every Outing, User and Date are alerted to the others preferences & can sharpen up their game and hone their social interactive skills in the game center. 2 hours prior is the confirmation cut off. Thus, all information should be sent upon confirmation.

Therefore, no later than 2 hours before the beginning of the first event in the Outings should any necessary information be sent.

Same goes for Group as nothing beyond the meter changes in the Group procedure.

Upon 1st booking Date is shown the categories in which Date is Rated & given hints on how to be a good date & achieve a good rating per each category.

Upon 1st booking User is shown the categories in which User is Rated & given tips on how to be respectful & generous to achieve a good rating per each category.

Automatically applies for the first Seven Dates engaged in, and continues for Users with a 2.5 Star Rating or below until average 3 Star Rating is sustained for 10 dates.

Hints can be accessed at any time under Help & Hint frequency settings managed under Settings.

A further component/process of the present disclosure provides Gameplan toggle may be illuminated If a User Green Lit 25 Date(s) or has 70% compatibility with 10 Dates then send to GamePlan.

If User sets spending gauge then all Events and Profiles may be filtered according to the pre-authorized budget.

If User Readjusts Spending Gauge, then readjust Date(s) & Events in real time;

If User has enough or is within a 30% range of Point Request Value in order to 'Finalize' with Date(s) then display in GamePlan Date Reel and based Upon whether a Date Green or Yellow Lit a Date.

If User lowers Spending Gauge, then Events beyond price range (+30%) may disappear. After User double taps Date(s) image in Date Reel Push Notifications are sent to Date(s) displaying Outing in Date(s) GamePlan and via Push Notification.

If User Does Not Readjust Spending Gauge, then illuminate 'Finalize' in Green and Check-Out.

If User satisfies the set Spending Gauge and points, then Dates and Outings can be secured.

If User does not have the points to satisfy the total listed in the Gameplan page, then Joux toggle may illuminate.

If a User Green lights a Date, Date may appear in the GamePlan queue, based on the aforementioned then after double tapping the Date's image, a request may be sent to that date via Push Notification & may show up in Dates GamePlan Page.

If Dates are Green/Yellow Lit then Date Reel's population may be ordered based on: similar 'hearts', Checked Events, Online Status (only online Dates are visible), Points, Average Response Time, Ratings, and the present invention's Network determined compatibility.

If User Green lights a Date and Date has not Green, Yellow, or Red Lit User then Date(s) appear in GamePlan.

If User would like to attend Outing with said Date, then User can double tap Date to Send Push Notification Invitation.

If Date accepts Push Notification Pop Up, which looks like a classy invitation with Who, What, Where, When, How much, etc., then Date's GamePlan where Date views User's invitations are visible one by one. Then, the application may illuminate Users 'Finalize'.

In an instance, the Date may accept an invitation popup by hitting accept. Alternatively, Date may accept invitation by Double tapping User Image. In one instance, the Date may also accept an invitation by clicking 'Finalize' in Date's GamePlan Page (after review of Event Reel). If Date(s) accepts then Green Check may appear on Date Image in Date Reel. Also, Date(s) who have accepted are displayed first and prioritized from Left to Right.

If Date(s) have Green Checks of acceptance, then the Date(s) are prioritized. If the Date(s) have been accepted, then the Date(s) are moved to the far Left of the Date Reel also known as the beginning of the Date Reel.

If User Drag & Drops Green Checked Date(s) then spending Gauge & Points may adjust accordingly in real time.

If User Drag & Drops accepted Date(s) in Drag & Drop Zone, then 'Finalize' may illuminate in Green. In an instance, First User to 'Finalize' with Date(s) may get Outing with Date.

Other Date(s) that were too Late Date(s) may disappear from Late Users GamePlan Date Reel, but may show up again in Users HomePage Map.

Upon User 'Finalize', Date may be locked into Outing and Date cannot receive any more request invitations and temporally disappears from Dating Pool until Outing is complete.

If Date(s) have reviewed the proposed Outing & spending gauge of User and accepted by clicking 'Finalize', then the Date(s) may show up in the Users GamePlan Date Reel with a Green Check in the middle of their photo.

If Date Clicks 'Finalize' then Date disappears from every other User(s) queue except for the one Date Finalized. Thereafter, User can confirm purchase and Push Notification may be sent to both parties displaying Outing & Meet Up Location.

If the Date does not accept within an allotted time frame, then Date may disappear from Users queue.

If Date receives numerous requests per 24-hour cycle, then Date becomes Metered requiring more points and drafts points hourly. This may be comparable to Uber's Price Surging.

If a Date becomes Metered then a meter may appear in bottom right corner of Date(s) picture in GamePlan, the present invention and Dates Profile Page.

If Date Has Meter, then Date may manipulate Meter swipe on and off feature.

If the User has Date(s) green checked in the queue, then User drags and drops one or more Date(s) into drag & drop zone for Finalize. Then, User purchases Outing and after that, both may be notified with Push Notification of Meet Up or pickup UBER API Location(s).

If User Drags & Drops multiple Date(s) then the application may adjust points for Date(s) & Spending Gauge in Real time.

If User Drag & Drops multiple Dates simultaneously then a display may Pop Up saying "Group Outing?"

If User clicks "Group Outing" then the application may send Push Notifications to Dates notifying Group Outing, which prompts automatic Meter.

If Group Outing is accepted by Dates, then Dates may receive automatic meters for the Outing.

If Date already has Meter and is added to Group Outing, then factor time and a half hourly.

In case of Group Outing, every date may be on a meter and every date may be notified of the group Outing before they agree to attend. All other details of the invitation/GamePlan process may remain unchanged.

If User double taps Date(s) image (in Date Reel) and do not check Events in Event Reel then aggrandize Event Reel.

Events must be prioritized because Events maybe be the core of the proposition to Date(s). Further, events may directly impact Spending Gauge viewed by Date(s) and reward points recuperated.

If User double tap Events in Event Reel then Green Check may appear and directly impact Spending Gauge (CHECKed Events are being "Attended").

If User is yet to satisfy X(Dismiss), 'Heart'(Like), Check (Attend) System in Outings Page then the application may populate Event Reel (GamePlan). Event Reel may be populated by recommending the Events most likely to suit the User Based on the User's Profile Filtering, determined by the present invention's Network System, and factoring in Date's Ideal Outings based upon Date's 'hearted' and 'Checked' Events.

If User did NOT 'check' or 'heart' events in Outings Page then GamePlan's events reels may be populated by the preferences of the Green Lit Dates Past Events Initial Survey Mood Gauge, Trail Preferences, Points, Interaction with Zones, Challenges, GamePlan Icon Interaction and Belt-Level.

Certain trending events may be prioritized based upon partnership agreements, community trail, zone, club and event interaction. This may be an open-ended system to promote affiliated partners and ticketed events available in the present invention's Ticketing Agency.

Select Events may be symbolized by a Golden Bowtie.

Ticketed Events may be promoted in the present invention's HomePage Map through the present invention's Ticketing Agency or application content or trail creators via Web Application method.

In present invention's ticketing, if a ticketed event in events page is selected, the toggles to scroll down may be selected for "section" and "number of tickets".

Seat options may be generated and those available may appear in a third scroll down toggle, i.e., section 3 and 2 tickets may generate options in third scroll such as 3Aa+3Ab $210.00–3Ff+3Fg $180.00 etc.

SEATMAP may be accessible where the map is typically displayed over all events, such as, in the Outings Page, and may be panned and viewed as the regular map does. Thereafter, if User clicks on the upper map area, then map may enlarge, as it does to Pan in regular Outings listings. Further, two dots may appear below the image to switch from external map to internal map.

EXTERNAL MAP may be the location map provided in Outings Page for all events whether ticketed or not.

INTERNAL MAP may be the seating chart for any Events requiring seating selection.

The present invention may also have a Website for the Ticketing Agency to operate out of. If a Ticketed Event is selected, then User may be redirected to the present invention's Ticketing Agency to proceed with the purchase of the Ticketed Event.

The present invention's Ticketing Agency Website is also for Direct purchase, without needing full the present invention arrangements such as in Solo Mode.

If User clicks the check in Outings Page with at least 3 Outings or more that chronologically synchronize, then send to GamePlan or illuminate toggle.

Promotion of more events and Tips and Hints may help secure the perfect Outings for every User of the present invention.

If User is going to finalize a 1 or 2 event evening, the empty event slots may then aggrandize and a popup may appear saying something to try and get the User to book another event or two.

If User & Date have 2 or more identical or similar GamePlan Event Reels then the application may bypass Green & Yellow Lit Unless Red.

If Date is available for Outing (schedule wise) and has no conflicting request, then Date may show up in GamePlan and the present invention Page.

If Date establishes a GamePlan, it may Display Picture of User, one User at a time, Users Spending Gauge, & Events to be Attended with User. If Date has not already accepted Users Invitation Request in Push Notification Invitation, then Date double tap User's image to accept.

All compatibility between User(s) and Date(s) may be predicated on Percentage of similarities based upon User Intake Survey (the initial 5 question picture survey & the Word Based Survey 5 out of 100 questions that pop up every three Outings and every 100 Green Lights that feed back into the GameCenter), Icebreaker Usage, IceBreaker consumption, Rating, Events 'Hearted,' Events Attended, Events 'Checked', Location, Availability, Mood Gauge, GamePlan Icon Interaction, Belt-Level, Trail Interaction whether Online or Offline or Booked, Points required to book Date(s). If User has enough points required to book Date(s) or is within a 30% range, matching is predicated on more than whether a User green or yellow lit a date.

User may turn Uber Date Pick up Toggle On/Off.

Upon first User sign up, the application may have a pop up walk-through of application, including picture based survey and explanation of word based surveys concurrent throughout application.

Percentage compatibility may be displayed in bottom left corner of Date in reference to the User.

Percentage compatibility may be displayed in bottom left corner of User in reference to the Date.

A further component/process of the present disclosure provides the API UX. If a User is new to application, then the application may Initiate SignUp procedure. Then, the application may conduct Initial Intake Survey. Thereafter, the application may prompt the user to submit a Profile picture of themselves in the Approved Profile format, and Verify. Further, the application may commence walk-through.

Further, if a User satisfies walk-through, then open the present invention Page. Thereafter, User may begin to engage in Red, Yellow or Green Lighting profiles.

If a User has satisfied the present invention Page by Lighting 10-50% of Online Dating Pool, then the application may send the User to Outings Page.

If User has exhausted the present invention's Selection, then the application may send User to Outings Page.

If User has exceeded the amount of RED lights, then the application may send User to Outings Page.

If User is in Outings Page, the Outings Page Rating System may be activated. Further, the application may have CHECK for "Attending", HEART for "Like", and X for "dislike."

If User has Satisfied Outings in the present invention's main page, then the User may open the GamePlan Page to view selected/recommended Events/Dates in the respective reels.

Direct User(s) may double tap Event Reels to lock in Event(s) and Green Check that appears in the middle of Event Image.

If User has satisfied Event Reel, the application may aggrandize Date Reel so that User may double Tap available Date(s) to send invites to Date(s) for Outings.

If Date(s) did not respond to invites, then User may open GamePlan page to choose different Date(s) from the Date reel. If Date(s) did not respond to invites, then User may open Homepage Map to rebuild GamePlan If User has Date(s) that have accepted Outing Invites, then the application may apply Green Check in middle of Date photo in Date Reel and Display number of Accepted invites ON GamePlan Toggle.

If User . . . then the application may initiate Picture Based Survey showing 5 questions at a time of the 100 Questions available.

The picture based survey may be initiated after conditions are satisfied such as, if 25 Green Lights are given, or if Red Lights given are exceeded. Aforementioned conditions must also be satisfied for the picture based survey:
  a. DATEs: 10% of the present invention Network Dating pool.
  b. USERs: 10% of the present invention Network Dating pool.
  c. METERED DATES: 25% of the present invention Network Dating pool.
  d. If Low Ratings are received.
  e. If Low Ratings are given.

If Date is available for Outing (schedule wise) and has no conflicting requests or conflicting requests of lesser caliber, i.e. lesser event, less compatible User, or Date lit User with lower rating, then Date may show up in GamePlan.

If Date is a Red Light User, then Date may NOT show up in User(s) Date Reel UNLESS User is spending 30% more than what Date typically earns in Points or have 90% or more compatibility.

A further component/process of the present disclosure provides a Belt-Level. Belt-Levels may be the rating advancement and rewards system set up to draw information from the Users' past history of ArmCandy usage and past Outings, rewards and reviews. The Belt-Level may also be a feedback system and a visible ambassador to the Users Experience and rank. The Belt-Level may signify access and power within the ArmCandy Application Network. The Belt-Level System may be the process of recording the past Usage of all Users to determine their purchasing power, network, and experience within the application. Further, the Belt-Level may be a public view of what is representing the Users Back-End Data. Accordingly, the frequency of Outings may be recorded and used as a factor in the rewards system. Further, the Belt-Level System may consist of 8 levels of application participation represented by belt colors or degrees, such as, 5 levels of ribbons (Female), and 5 levels of bowties (Male). The Belt colors, ribbons and bowties may represent visual manifestations of the status of Users and Dates.

First, the application may have 8 Belt colors to be achieved—White, Yellow, Orange, Purple, Green, Blue, Brown, Red and Black.

Second, for females, the application may follow Ribbons, such as, Bronze, Silver, Gold, Platinum and ONYX. Likewise, for males, the application may follow AC Bowties such as, Bronze, Silver, Gold, Platinum and Black Diamond respectively from the first bowtie attained to the last bowtie attained, which is the highest ranking.

Further, personal information such as ratings, reviews or specifications may remain private, the Belt-Level System being the front representation as a whole.

Belt-Levels may be public to encourage all application users to increase their Belt-Levels. Higher Belt-Levels reward all application users. Accordingly, Users may receive higher percentage returns on all of their purchases. Further, Dates may receive higher percentage returns on all of their Outings. Moreover, events may be held specifically for a status group(s) and promoted in the Outings Page of all users as an advertised incentive for them to increase their status. For example, Users may promote an Event as 'A Black Ribbon Party', showing party descriptions etc. in the Event description. Accordingly, Users and Dates who are rated as Black Ribbon and above have the ability to attend this event in their Event page. However, those under the Black Ribbon status may only be able to view the Event page.

Further, once a User reaches the 'Black Belt' status they may be able to create an event. Additionally, once a User reaches the 'Black Ribbon' status they may create trails. Furthermore, once a User reaches the 'ONYX Bowtie' they may create a challenge, e.g. a selfie contest in a designated zone. Moreover, once a User reaches 'Black Belt' status and ONYX Bowtie they may be able to create a zone for event, challenge, etc.

Additionally, the types and colors of the Belts may affect frequency and standard of rewards received. Every new achievement earned from the white belt to the Onyx Bowtie increases in incentivized returns. However, White Belt may receive no return on their purchases for every Outing they book with ArmCandy.

The following standings may go up by 1% for every new advancement in the ArmCandy Belt system to a maximum of 8% returns.

For Users, this may mean greater returns on AC purchases.

For dates, this may mean higher incentives as a return to them. This may streamline the 'metered date' to become more flexible and neutral to all AC users.

Statistics may be available in the profile page for Black Belt Users and above.

Belts may be achieved (like in a role playing game) for certain activities, events, or ratings. Further, each purchase, activity, program and review may be assigned a value.

The 8 LEVELS and 5 degrees or tears within the ArmCandy Dating pool may impact the events and dates users may see with a 30% upward variance contingent upon spending, application Usage and Ratings.

IF Users are loyal to ArmCandy (belt system), they may be rewarded. Likewise, if they are increasing value in their life through the levels (Point Bank Colors & Degrees), they may be rewarded. Similarly, if they are cool and good to other users (DNA Rating System) and to those who have no voice (GameCenter), they may be rewarded.

If User has white Belt-Level, then User may not see certain Outing possibilities, such as restaurants, select clubs and movies, which are reserved to higher Belt-Levels. Lower level activities may be promoted for lower Belt- Levels such as chill spot or zone challenges. If User doesn't like Date (or vice versa), then User gets to cancel Date and look for another spontaneous Date in the same area where User is currently located.

Further, frequency of rewards & types of rewards received and visibility of recognition may be determined based on a combination of Belt Averages (Frequency of Use), Joux Bank (Level of Points on Store) and DNA Rating Value (How you Treat AC Pool).

Further, a sum of BELTS COLORS and DEGREES, POINTS BANK, DNA RATING SYSTEM may be averaged out and provide access to certain events, ArmCandy Dating pools, and rewards.

After the belts, for females, come the bronze ribbon, the silver ribbon, the gold ribbon, the platinum ribbon, and black ribbon. Likewise, for males, after ribbons, come bronze bowtie, silver bowtie, gold bowtie, platinum bowtie and ONYX bowtie.

A further component/process of the present disclosure provides the Spending Gauge. This helps determines UX for Outings and Dates. If User has Set Gauge, then Events and Profiles within that range may appear in the HomePage Map for browsing.

If User adjusts Spending Gauge Event Reel and Date Reel then automatically filter Events & Dates out of price point, in real time.

The Spending gauge can be increased by 30% automatically should the Users Compatibility and Interests be greater than 80%.

The Spending gauge automatically allows for Events and Dates up to 30% above the Spending gauge If over 80% compatible based on the cross referencing of the present invention's Network System and the User's Profile.

If User adjust Event Reel or Date Reel then automatically adjust Spending Gauge in, real time.

A further component/process of the present disclosure provides the Trail Creation Mode—as shown in FIG. 4 Photo Guide lines, beginning, middle, and end. Otherwise front and within. Shot must represent Icon Gameplan Language Classification, Mood, and Trail.

In an instance, Trail may be a combination of an Icon, Mood and 3 Photos.

Alternatively, User may simply publish their Outings. If User had perfect Outing, then application may provide option to publish.

A system may allow trailblazers organizers and promoters of the community to engage in streamlining organization and automating of events in their localities. Users may be able to publish their best Outings and experiences better. If the Trials that they blazed are sought out and used by others, they may receive points/Joux as well as Belt-Level increase.

Whilst in trail creation mode, users may be invisible to AC dating pool

Figure 16:
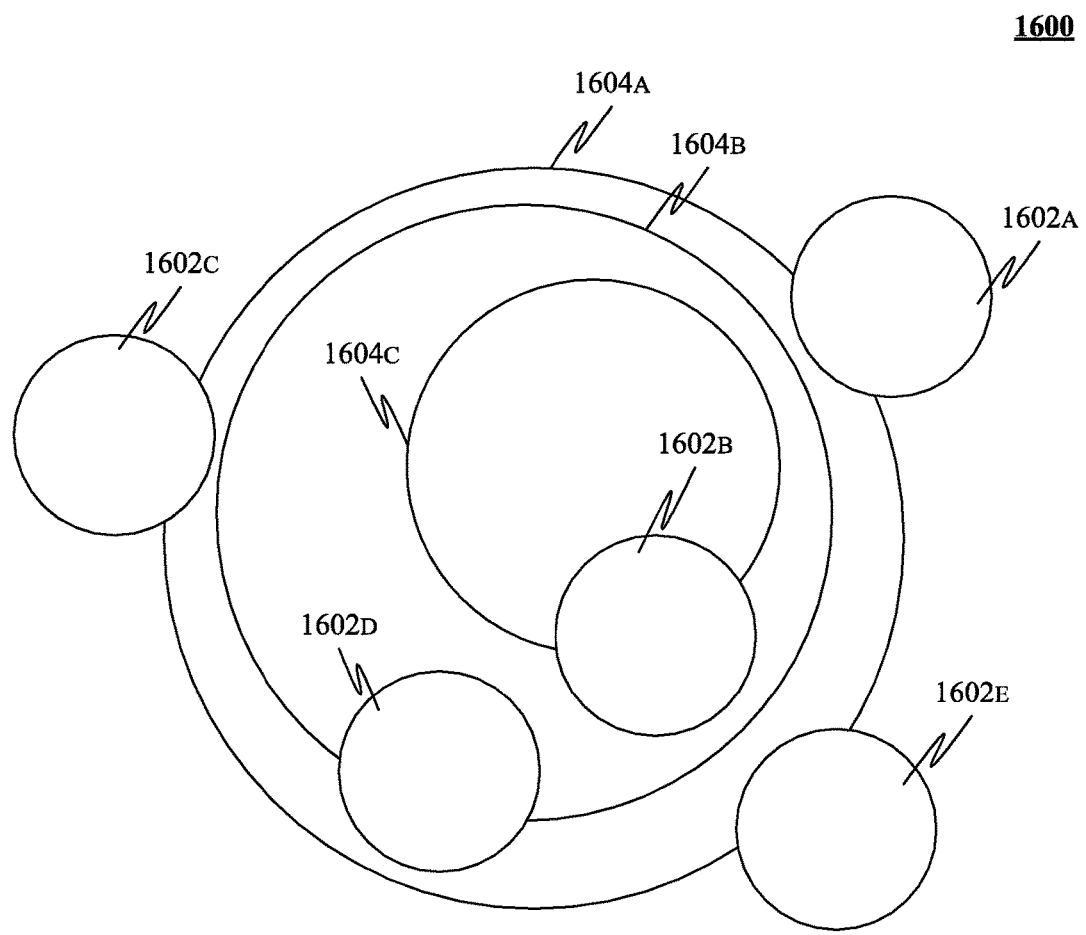
FIG. 16 illustrates a screenshot 1600 of a User interface for facilitating social networking based on events depicting a plurality of dates and events based on affinity metrics (i.e. Soul-Phi radius), in accordance with some embodiments.
Figure 17:
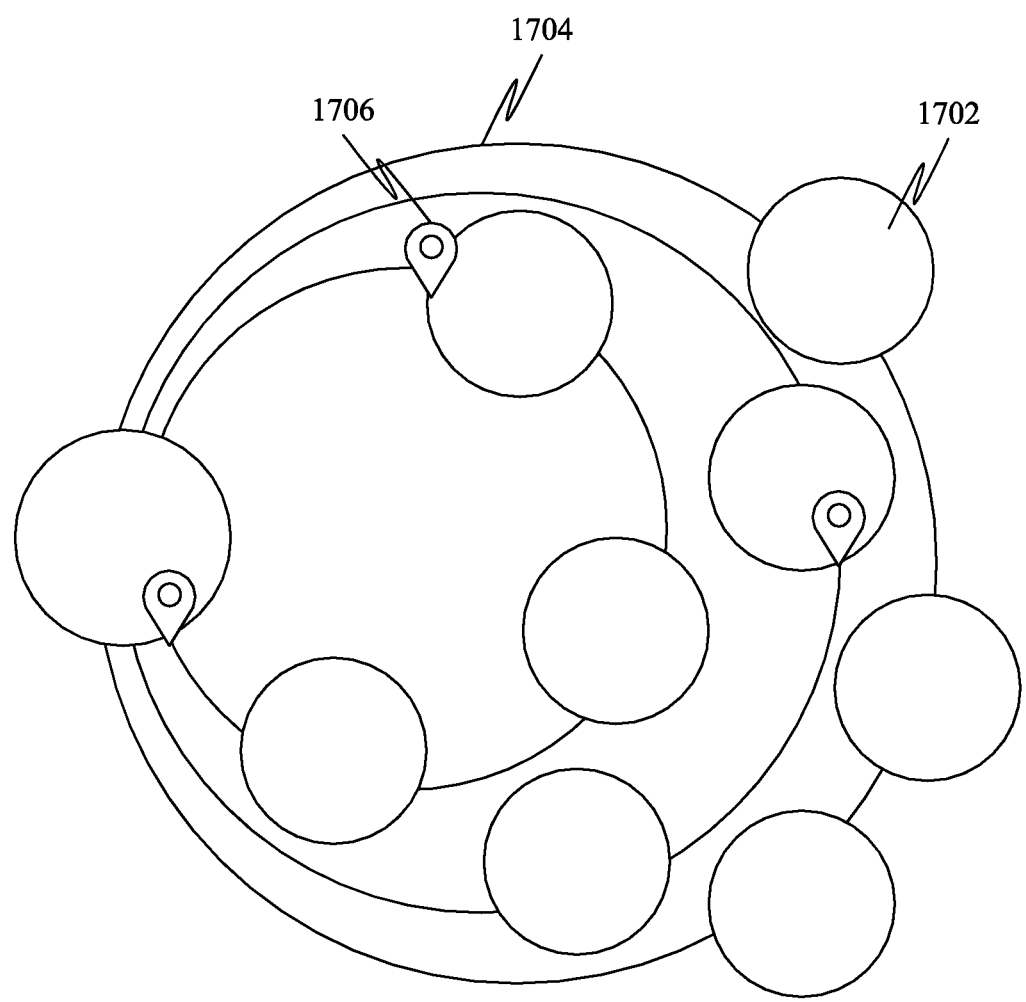
FIG. 17 illustrates a screenshot 1700 of a User interface for facilitating social networking based on events depicting a plurality of dates, events and locations based on affinity metrics, in accordance with some embodiments.

A further component/process of the present disclosure provides the Location Radius/Soul-Phi radius a process in which users may connect and with all preferences, processes, and people within their level of compatibility. For instance, a snapshot of the user interface may be as shown in FIG. 16 and FIG. 17, which depict a plurality of dates (e.g. 1602A-1602C) and events (e.g. 1602D-1602E) based on affinity metrics (i.e. Soul-Phi radius). Accordingly, one or more of an event and a date may be within a "distance" (or Soul-Phi radius) represented by a plurality of rings (e.g. 1604A-1604C). Similarly, as shown in FIG. 17, events 1702, dates 1704 and locations 1706 associated with one or more of the events 1702 and dates 1704 may be displayed. Accordingly, within a glance of the Soul-Phi Radius, Users may determine their location, the location of their, online friends, online allies, or available Dates, User may also determine available events, challenges, and zones, predicated on the by color, patterns luminosity, translucency, volumes, forms, dimensionality, perspective, level, façade and dimensionality of the circular rings. Personal information such stats, metrics, about the User may be found on the most inner circle. On first and inner most ring, there may be an event, zone, action or challenge. Similarly, the second most outer ring may be circle of friends, second ring would be Date(s) and Allies.

The radius and influence of ones Soul Phi Radius may be based upon how they connect and interact with the invention.

If Users and Dates are in same radius, then both may be able to be viewed by the correspondent in ArmCandy Page and HomePage Map.

If User and Date(s) are in same radius then both may be able to be viewed, because of Bluetooth Technology, by the correspondent on Outings Page via Map when on Date.

Default User & Date is 3-mile radius.

User can expand and contract Radius via Pinch & Pull Technology or scroll through miles 1-25 miles.

A further component/process of the present disclosure provides the Homepage Map. If User is yet to satisfy the ArmCandy Red, Yellow, Green Light System, then the application may Populate Events in HomePage Map based upon User interaction with Iconic Gameplan interaction.

Gameplan Icons

Restaurant
Cafe
Movie/Theatre
ChillSpot
Recreation
Events (Tickets Required)
Group
Exposition
Lounges
Sports
Relax
Activity
Happening (Random Events) (User Organized Events)
Concerts
Nature (Hiking & Walking Trails)
Club/Party (Bottle Pop)
Monuments
Workout
Beach (party)
Extreme (Rock Climbing, Sky Diving, Motor X, At Your Own Risk)
X-Club (subscription) e.g. Muscle Car Club, Yoga Club Basketball Club User may activate or deactivate any of the Icons Supra by clicking genie bottle button located on the right middle side of homepage map. As a result, Users may filter or modify Homepage Map events and respectively in turn visible Dates, Friends, and Allies.

Intake Survey
Mood Gauge
Spending Gauge
Belt-Level
Degree of Bowtie or Ribbon
Location
Iconic Gameplan Language
Past Event Attendance
Availability
ONLINE Status of Dates ONLINE Status of Allies
ONLINE Status of Friends
'Hearted' Events, 'Checked' Events,
Attended Outings.
ALL the information collected about the User may be applied to the Filters within the ArmCandy system.
If User is yet to satisfy the Gameplan Iconic Language, then populate the HomePage MAP based on following:
  a. Location
  b. Intake Survey
  c. Trending events, activities, Outings, and Zone's based on Location
  d. Select Events.
  e. Direct New Users Towards Chill Zone If User clicks on an Event which the User still has not heart, then click on the Event. Thereafter, User may go to Outings Page to a preview of the Event.

The Outing(s) if checked, may appear in Events Reel in GamePlan.

The Homepage MAP may be populated by a series of profiles, venues and events that show compatibility with the User's desires and preferences (concluded by the ratings the User awards to certain Dates or Outings) and the User's pattern of activity as concluded by the ratings of Past events, Date evaluations, Spending gauge, Type of event etc. Reinforced by gradual evolving color, patterns luminosity, translucency, volumes, forms, dimensionality, perspective, level and façade.

A further component/process of the present disclosure provides the Game center Suggestion to tighten up users and dates predicated on feedback per DNA Rating System while Using AC Dating Pool. The application popup may appear, saying "wanna tighten up your game?" yes or no.

If User or Date replies yes within the helpful hints section or during survey, then Game Center Engine may be initiated.

If User or Date replies no, then Game Center Skips and Event Recommendations, DNA Rating Increasing Recommendations, Upcoming Promotions.

Figure 12:
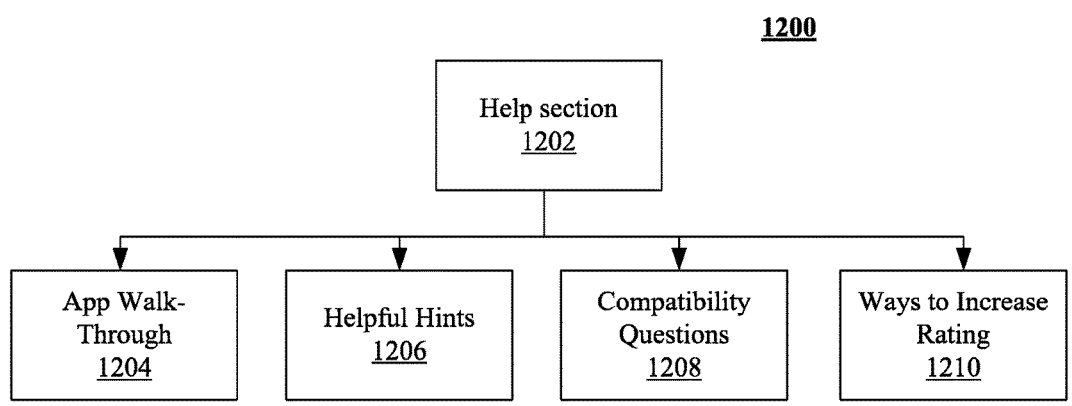
FIG. 12 illustrates a flowchart of a method 1200 of facilitating social networking based on events comprising presenting help information to a user, in accordance with some embodiments.

Pick your game center personal video mentor and area of improvement enter challenges to sharpen your game have situations broken down to you step by step we're here for you when you're ready (stage 1206 as shown in FIG. 12).

A further component/process of the present disclosure provides the Profile Page. Tab where User's and Date's can slide to Cancel a confirmed Outing.

If Prior to the 2-hour cancellation cut off.

Tab where Date can slide to Remove Meter during an Outing

Tab where Dates Cash in Points for direct account transfer.

Tab Where User can Purchase Points when credit card information is fulfilled.

If a User 'hearts' an IceBreaker, then this can be found in the 'ICEBREAKER' section in Profile.

If User has similar IceBreaker Usage as other Dates, visible because of each Ice Breaker Push Notification pushed upon attendance at each new Outing which has a 'Heart' 'Check' or 'Dismiss' Feature, then prioritize display in the present invention Page & HomePage Map.

If User has similar event attendance patterns to other Dates, visible because of check in feature at each Outing, then Display in HomePage Map next to events & prioritize in the present invention Page.

If a User attends a past event, or a past date, then this can be found in the 'PAST' section in Profile.

Listed in decreasing chronological order with the "confirmed dates" at the top followed by the "completed dates," with Rating Received listed.

If canceling the ability to cancel a confirmed date may be next to the confirmed dates listed, repercussions after 2 hour cut off.

ETA Changes
RideSharing Toggle.

If Date establishes GamePlan then it may Display Picture of User, one User at a time, Users Spending Gauge, & Events to be Attended with User. If Date has not already accepted Users Invitation Request in Push Notification Invitation, then Date can double tap User's image to accept.

If Date goes to Gameplan page Date can click all photos to go to their respective pages If User has requested an Outing with Date, it may be displayed IN GAMEPLAN.

Herein follow the steps for the user. Put border around the photos or Shade or fade the photos to 40% opacity to prompt the Date to select their photo to see the invite, or have a notification board accessible by the little number bubble, akin to Apple notification signals, in the upper left section of the screen or have invites posted in the Dates profile page and have the profile toggle illuminated when there are invites unanswered to prompt them to go and check the invites in their profile page, Listed above past Outings, in the Past Outings tab.

A further component/process of the present disclosure provides the Mood Gauge. The Mood Gauge System (MGS) may be incorporated as a filtering system to aid in the selection process of events for AC Outings and in the promotion of incentivized ArmCandy Events. As a result, the ArmCandy User may have a more refined variety of Events, Dates and incentivized offers to view and select based on the work of the filtering systems of the ArmCandy application. The MGS is pertinent to the filtering and customizable adjustments of the AC system; to effectively be used as an additional filtering component (that collects information of the Users upon their completion of the Mood Gauge Surveys). There are several points of information acquirement and increased purchase by administering mood gauge to each User.

The Mood Gauge System may be launched upon the initial opening of the application for each day that the application is opened by the User. In addition, the MGS may be initiated every time the User opens the application after a time period of 2 hours or 120 minutes has elapsed since last opening the application. The exception to the 2-hour time lapse for re-questioning is if the User has already created an Outing; such as sent invitations, selected Events to attend, under time constraints to make an Outing that the User booked for that particular date (day or night). Alternatively, User hasn't been away from the application for the time elapse period.

Described below are several Events that may have been organized into categories by Intensity of Physical and Social intensity.

Each may be represented by a circle zone and pattern that glows when the activity is hot.

Low Intensity/Highly Passive
  Romantic dinner
  Watch a movie in the theatre
  Have a picnic in a park
  Go to the beach and make a bonfire or go to bonfire mode invite people for cool activities
  Go upon a predetermined Trail
  Chill Spot Moderate Intensity
  Vernissage in a museum
  Classic concert in a theatre/Jazz festival
  Go to an art conference
  Sightseeing
  Go to a karaoke bar
  Participate in a fundraiser
  Safari Zone/X Club e.g. (Gamer Tournament)
High Intensity
  Go bowling/billiard
  Watch football life at the stadium
  Popping Bottles
  Rent a yacht and throw a party
  Go to a casino
  Rent a bike and go on a tour
  Happening
Very Intense
  Bungee jumping
  Dancing in a club
  Go to a festival all day/night
  Go to a theme park
  Participate on a charity marathon
  Group Game
  X-Club American Muscles Club Vs. Imports Club
Screen Asks User how is User Feeling Today (Mood Gauge). Options are:
  1. I feel like moving mountains (Active)
  2. I feel like doing something Low Key (Relax)
  3. Surprise me, I don't know (Surprise Me)
  4. I feel like meeting people (Highly Social)

Figure 11:
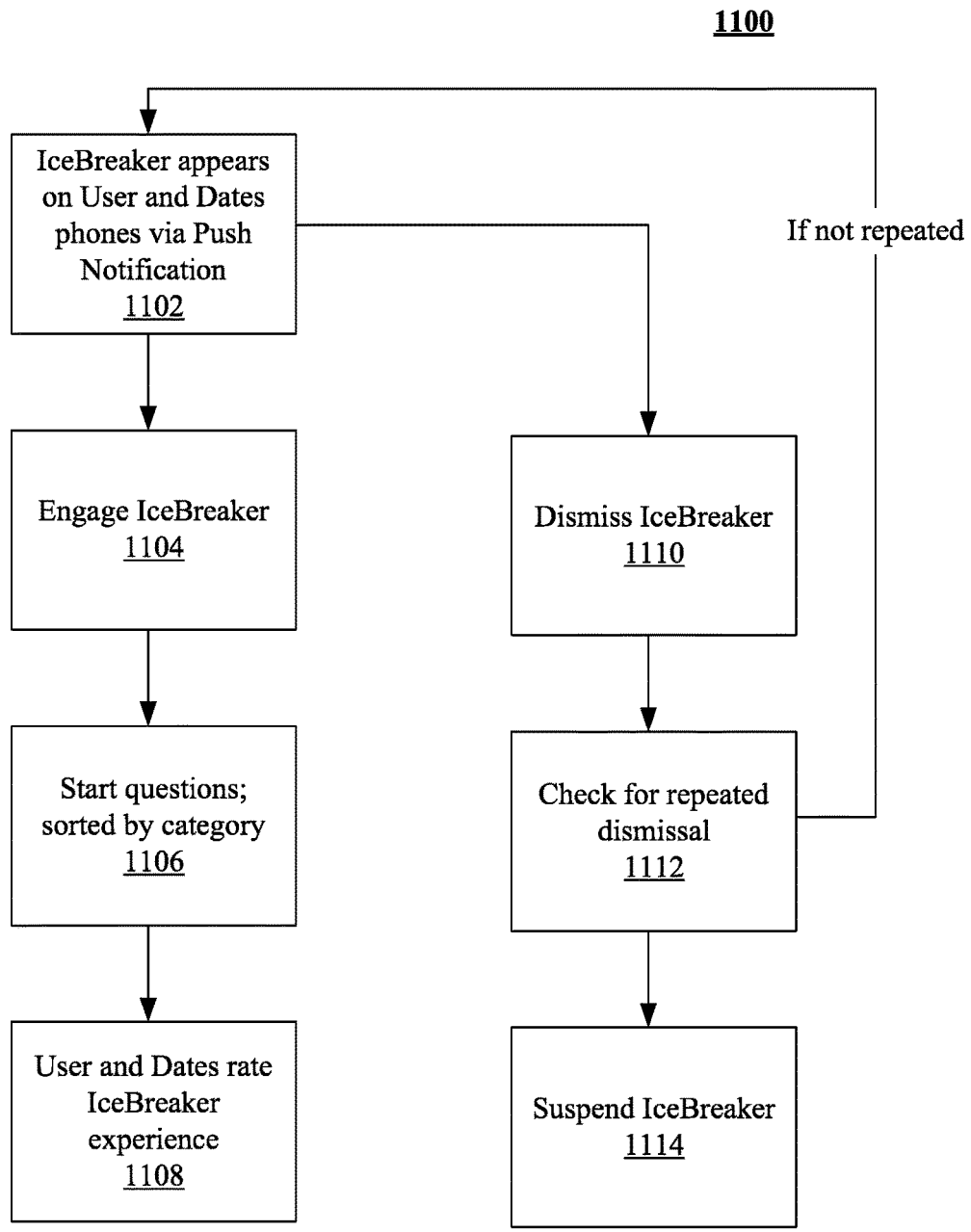
FIG. 11 illustrates a flowchart of a method 1100 of facilitating social networking based on events comprising management of an icebreaker, in accordance with some embodiments.

A further component/process of the present disclosure provides the IceBreakers process. This is depicted in FIG. 11. The IceBreaker may appear simultaneously on the User & the Dates phone via Push Notification 15 mins into EVERY Event that can be responded by X or CHECK (stage 1102 as shown in FIG. 11).

X Dismisses the Icebreaker (stage 1110 as shown in FIG. 11).

CHECK engages the Icebreaker (stage 1104 as shown in FIG. 11).

If the User and Date are engaging in the Outing for 15 minutes, then a Push Notification for an IceBreaker may automatically appear.

When IceBreaker Appears it may have a Check for activate or X for dismiss. If Icebreaker is activated, then IceBreaker is used. Further, the questions may be sorted by category (stage 1106).

HEART for enjoyed this IceBreaker and would like to use again or X for dismiss.

If the IceBreaker Is repeatedly dismissed (stage 1112), then IceBreaker may be suspended (stage 1114).

If the User is categorically intellectual & sports based the Date may receive an intellectual or sports based question to ask & Vice Verse. This can be determined through the Users interaction by events 'hearted', events attended, intake survey, & previous IceBreakers 'hearted'.

If Date has no knowledge of User's favorite category, then IceBreaker goes to User's next best preference.
Categories:
  Change.
  Self
  Funny
  Factual
  Silly
  Romantic
  Sexual
  Comedy—Dumb Questions
  Pop Culture—Did you Hear About?
  Sports—Did You See That?
  Games—Never Have I Ever, 21Q, Would you Rather?

Additionally, the User and Dates may rate IceBreaker experience (stage 1108 as shown in FIG. 11).

A further component/process of the present disclosure provides the Bluetooth Technology processes. Bluetooth Smart technology automatically pairs with User & Date when within 15 ft Proximity. A photo of the date may appear as a pop-up on other user's phone when in 15 ft radius, along with the question, "is this the person you booked a date with?"

If NO Date 'cancel option' is revealed. If NO and neither User nor Date cancels, the person who responded NO may be asked again during exit survey, "Did the person you went out with look like their photo?" If NO follow up question may be asked i.e. weight disparity, or looked entirely different If Date wanders out of radius more than twice per Outing or Once or Twice for more than 15 mins then send Push Notification to User "All Is Well With "[DATES NAME]?"

If "All Is Well with "[DATES NAME]?" and User clicks YES then END prompt, If User Answers NO then, Date Survey Prompted (DNA Rating System) with option to automatically cancel and replace Date after User has Rated Date.

If Date averaged below a 2.5 out of 5-star rating and did not cancel OPTION PROMPTED "End Date?" If Yes OPTION, "Select new date?" is prompted If User Selects Yes then Invitation is Sent to All Nearby Available Date(s) via Push Notification.

If Date leaves Users Bluetooth pairing zone 3 times per Outing or for more than 15 mins then send Push Notification "Please enjoy your Outing with your date!"

Date may no longer rank as high in the data pool in the present invention after consistent Dates Ended. With a continuation of cancellations, the User is Suspended.

If Date Is outside Bluetooth Radius of User and Date has 'Meter' running, then Push Notification that meter halts until Date is back within radius.

If 3 out of 7 Dates END DATE with specific User, then ended Dates are prompted to notify the present invention of the issue with that User.

A further component/process of the present disclosure provides the Mapping process. The application naturally determines Search Radius based on Geographical Typography and Urban Environment, User can expand Or contract Radius, or type in miles radius In Settings.

If User or Date is mobile, then Refresh Map every 50 feet in Outings.

A further component/process of the present disclosure provides the Calendar process. The Date can blackout specific dates within month in settings by double tapping unavailable days in settings calendar or Outings Calendar (week range).

Date can also blackout generally unavailable days i.e. Mon-Fri or M, W, F and double tap to make specific days available.

A further component/process of the present disclosure provides the Requests process. Point Request value formula for Dates. Variables may include: Life of Usage, Month, Week, etc. Variables do not average in Book Out Days.

((average point request value during entire usage of
  application+Monthly average point request
  value at end of 24 hr cycle+average of specific
  week of activity)/3)/2=the starting points
  request value of a Date in the next 24 hr cycle.
  Blackout days are excluded from averages.

If Date is available schedule wise for Outing and has no conflicting request, then Date may show up in GamePlan.

If Date(s) have more than 2 invitations in 24 hr cycle then increase points required by 10% for each User thereafter that sends Request within 24 hr cycle and limit visibility in the present invention Page to outside Users who have yet to request said Date that have inferior averaged Spending Gauges in comparison to the User in request group who has the highest Spending Gauge, or Users within Point Range to acquire Date, unless Date has similar Outing Requests.

If Date has appreciated by 75%-point value within 24 hr cycle and has at least 70% or more Green Lights from User(s) and Ratings above 2.5 then Date(s) acquires 'Meter'

If Date(s) receive 2 Request for Outings from Users within 5 mins then increase points required by 25%

If Date(s) receive 4 Request for Outings from Users within 5 mins then increase points required by 50% (so on so forth).

If Date(s) increase in Point Request Value required for Outing exceeds Users Points by 50% then Date may drop out of the Users, the present invention Dating Pool.

If Date is not metered, then Date must accept 1 of 10 User invitation requests per active 24 hr cycle. Number must fluctuate as Dating Pool grows.

If Date is Metered, then Date must accept 1 of 20 User invitations Request in order to view more invitations pertaining to 24 hr Cycle. Number must fluctuate as Dating Pool grows.

If Date(s) have over 10 invitations per 24 hr cycle and Date has at least 80% green lights, then Date automatically receives meter.

If a User Green lights a Date in ArmCandy Page or Homepage Map, then Date appears in the GamePlan queue, based on the aforementioned, then after double tapping the Date's image, a request may be sent to that date via push notification and User may show up in Date's Date Reel in Date's GamePlan Page.

If Date accepts User Request, then User may receive a Push Notification & Date(s) image may appear with a green check in GamePlan Date Reel and Date is ready to be Dragged & Dropped for 'Finalize'.

If the Date does not accept within an allotted time time frame of 24 hr Cycle, depending on the buffer of time away from the first Outing then Date may disappear from Users queue.

It is not until the User has Date(s) green checked in the queue, and then drags and drops one or more into drag & drop zone for Finalize & User purchases Outing that both may be notified of Outing Sequence & Location meeting.

A further component/process of the present disclosure provides the Push Notifications process. If User selects a Date out of point range, then more points must be bought in order to send Push Notification to Date in GamePlan. User(s) can send Push Notification to Date(s) by double tapping the picture of Date Reel in GamePlan.

If User receives 60% or more Invitation request for Outings than User sends out via Push Notification and has 60% Green Lights, then User becomes a Date.

If Date receives Inferior to 2.5 average stars then Date receives 5% of total preset Spending Gauge and Push Notification is sent "Uh-Oh you received a Low Rating".

Dates can Increase their average Rating per the present invention Application independent of Users by 2.5% (of Star Rating Scale) every time Date is on time. Date may be informed via Push Notification reminder Date(s) & User(s) can increase their rating (an hour or two before first Outing) and on the 1st, 3rd, 6th, 12th, 24th, Outing and every 6th Outing After. Unless Date is Late, remind Date on Next Outing 2 hrs Before first Outing and every 3rd Outing After.

Dates can Increase their average Rating by 5% per the present invention Application by accepting User within 5 mins of the initial Push Notification from User to Date. The Date may be informed via Push Notification that Date has the option to increase their rating.

If a User cancels after Finalize i.e. because of no show, or Tardiness 15 mins late, then send additional Push Notifications via Pop Ups allowing User(s) to communicate without chatting i.e. "[DATES NAME] is on her way and may be there in (15) mins (5-45 mins sliding scale adjustable by User or Date in Push Notification)." 2.5% of Users and Dates general points are deducted for Tardiness and Rating decreased by 5% and Date is less visible in Dating Pool.

If a User cancels because of their Date during Outing, then User can only be refunded half the points used to acquire Date and User may receive Push Notification Pop Up asking if User wants another Date (Display Dates In Pop Up) and send Push Notification to All Dates User Double Taps in Pop UP. (First Date to Accept replaces annulled Date)

If User wants to go out with another Date, then Display Dates Options for night Out in HomePage Map or Game-Plan. If Date accepts User in Push Notification Pop Up or double taps User in GamePlan Date Reel then send Push Notification to both User and Date setting meet location.

If User requests another Date after cancellation Date, then send Location Based Push Notifications to nearby Dates prioritize User Request in Dating Pool and reduce points cost for next Date(s) by 20% to replace User(s) annulled Date.

If a Date is compatible with User by 80% or more based on Location, 'Hearted' & 'Checked' events In Outings, IceBreaker Consumption, IceBreaker Interaction, Points Available, Events Attended & User Survey) and Date clicks 'Check' on a certain event in Outings Page, then send Push Notification to all Users nearby who Green lit the Date and meet compatibility percentage. A Date that accepts Users invitation may be displayed in the Inventions HomePage Map and Gameplan Respectably. Pop Up may state "Do you want to take [DATES NAME] out?"

If Date accepts Push Notification Pop Up (Looks like classy invitation with Who, What, Where, When, How much) then Date's GamePlan Date Reel are visible one by one.

The Date's GamePlan may Display Picture of User, one User at a time, Users Spending Gauge, & Events to be Attended with User. If Date has not already accepted Users Invitation Request in Push Notification Invitation, then Date can double tap User's image to accept.

Promotion of more events and Tips and Hints to help secure the perfect Outings for every User of the present invention.

If User is going to finalize a 1 or 2 event evening the empty event slots, then aggrandize and a popup could say something to try and get the User to book another event or two.

If Date clicks the Check in Outings Page, then send automatic Push Notifications to Users that Green Lit Date or even Yellow Lit if 80% compatibility or more. These action are triggered when Date clicks the 'check' in Outings Page.

It's easier to think of GamePlan as a prepositional event planner. If User(s) selects Event(s) & Date(s) by double tapping which Event(s) Users would like to propose to Date(s) in Event Reel and users double tap Date(s) in Date Reel then send Date(s) Push Notifications.

If User confirms purchase after clicking finalize and processes in shopping cart. Once purchase confirmed by User Push Notification invitation is Pushed to all parties displaying Outing.

If Date(s) 'Checked' an Event in Outings Page that Date would like to attend then Users Date(s) have Red Lit may receive Push Notifications If Red Lit Users Have High Ratings, above 3.5 stars averaged, High Spending Gauge, 30% above what Date has averaged, & Above 70% compatibility.

If User would like to attend Outing with said Date, then User can double tap Date to Send Push Notification Invitation.

It's easier to think of it as a preposition, the User selects a Date & Events then double taps Date(s) in Date Reel to send them Push Notifications after selecting Events in Event Reel.

If a User Green lights a Date, Date appears in the User's GamePlan queue, based on the aforementioned, then after double tapping the Date's image, a request may be sent to that Date via Push Notification and may show up in Date's GamePlan Page.

If 'metered' Date removes 'meter' during date, then send Push Notification to User Stating "[DATES NAME] is enjoying her evening!"

If User has satisfied the Green/Yellow properties, then send to Event Reel to double tap Events User would like to attend and double tap Date(s) User would like to send Push Notification Invitation.

If Date(s) accept after Push Notification, then Dates appear with a green check within GamePlan Date Reel and can be Dragged & Dropped for 'Finalize'. Upon User 'Finalize', Date is locked into Outing and Date cannot receive anymore request invitations and temporally disappears from Dating Pool until Outing is complete.

If Invitation is sent to Date and no response has come from Date prior to the 2 hour Cut off time, then the Gameplan is ready to send NEW invitations to New Dates.

The User may be prompted to send for replacement Dates with high response rate timing for a Last Minute Date request.

If the original Date responds and confirms BEFORE any replacement Dates have responded, then original Date can attend or if User doesn't send invitations to anyone else and original Date responds then User can take original Date out.

If Original Date 'gets the Outing' after the 2-hour time cut off then "late Date" consequences, to encourage prompt responses in the future If User does not satisfy Number of Points to secure Date(s) and Date is within 30% of averaged points spent to secure Date then User can purchase more points to secure Date, send Push Notification to User, "Almost there! Get more points to secure a date with [DATES NAME]". Only Dates who have accepted invitation request and are Green Checked In Date Reel is when User is notified he requires more points for specific Date.

If Date Accepts Outing Request upon Via Push Notification Pop UP, then send to GamePlan.

If User clicks "Group Outing" then send Push Notifications to Dates notifying Group Outing, which prompts automatic Meter.

It's easier to think of it as a preposition, If User has already selected, as in checked, three chronologically synchronized Events in Outings Page then User Need only select Date(s) by double tapping Date(s) in Date Reel to send them Push Notifications. ELSE User has not satisfied Outing Page then User Must double tap Events in Event Reel prior to sending Push Notifications To Date(s).

If purchase processed by User, then Push Notification is Pushed to all parties displaying Outing & Meet Up Location and Date(s) no longer receive invitations.

No users may ever know whether another User or Date has Green or Yellow Lit them. If User double taps picture on Date Reel to send Push Notification to Date, then the Date can assume he or she was not Red Lit.

If a User Green lights a Date, Date may appear in the GamePlan queue, based on the aforementioned, then after double tapping the Date's image, a request may be sent to that Date via Push Notification & may show up in Dates GamePlan Page.

If Date Clicks Finalize then Date disappears from every other User(s) queue except for the one Date Finalized and User can confirm purchase, then Push Notification may be sent to both parties displaying Outing & Meet Up Location.

It is not until the User has Date(s) green checked in the queue, and then drags and drops one or more into drag & drop zone for Finalize & User purchases Outing that both may be notified with Push Notification of Meet Up Location.

If Date accepts Push Notification Pop Up (Looks like classy invitation with Who, What, Where, When, How much) then Date's GamePlan where Date views User's invitations are visible one by one then illuminate Users 'Finalize'.

If User has similar IceBreaker Usage as other Dates (visible because of each IceBreaker Push Notification pushed upon attendance at each new Outing which has a 'Heart' Check or Dismiss Feature) then prioritize display in the present invention Page & HomePage Map.

FOR Each Different event or venue attended during the Outing, one IceBreaker may appear simultaneously on the User & the Dates phone via Push Notification, 15 mins into Event, that can be responded to with X or Heart.

If the User and Date are engaging in the Outing for 15 minutes, then a Push Notification for an IceBreaker may automatically appear.

If Date wanders out of radius more than twice per Outing or Once or Twice for more than 15 mins then Push Notification may be sent to User "All Is Well With "[DATES NAME]?" and send Push Notification to Date asking if all is well or if Date wants to Cancel Date, Report User (Disrespect, Harassment, Other), or Continue Date? If Report User for Disrespect or Harassment 3 times, then Suspend User automatically.

If "All Is Well with "[DATES NAME]?" and User clicks YES then END prompt, If User Answers NO then, Date Survey Prompted (DNA Rating System) with option to automatically cancel and replace Date after User has Rated Date.

If Date averaged below a 2.5 out of 5-star rating and did not cancel OPTION PROMPTED "End Date?" If Yes OPTION, "Select new date?" is prompted If User Selects Yes then Invitation is Sent to All Nearby Available Date(s) via Push Notification.

If Date leaves Users Bluetooth pairing zone 3 times per Outing or for more than 15 mins then send Push Notification "Please enjoy your Outing with your date!"

If a User Green lights a Date, Date appears in the User's GamePlan queue, based on the aforementioned, then after double tapping the Date's image, a request may be sent to that date via push notification and User may show up in Date's Date Reel in Date's GamePlan Page.

If Date accepts User Request, then User may receive a Push Notification & Date(s) image may appear with a green check in GamePlan Date Reel and Date is ready to be Dragged & Dropped for 'Finalize'.

If User engages in IceBreakers, then User can 'Heart' IceBreaker else IceBreaker automatically disappears after 10 mins of idle use or until Next Outing. (Users & Dates may receive an IceBreaker via Push Notification 15 mins After the User and Date are engaging in the Outing).

If the User becomes within the 15 ft proximity the Bluetooth technology may activate and a push notification may be sent to the User(s) for verification.

If User engages Outing, then during and after the Outing Push Notifications sent via DNA Rating System which Rate Locations after each venue and Date at end of Outing.

Each Different event or venue attended during the Outing, one IceBreaker may appear simultaneously on both the User & the Dates phone via Push Notification, that can be responded to by 'Check' for use or 'X' for Dismiss.

If Date receives Inferior to 2.5 average stars then Date receives 5% of total preset Spending Gauge and Push Notification is sent "Uh-Oh you received a Low Rating".

If a User cancels because of their Date then User can only be refunded half points and User may receive Push Notification Asking If User wants to go out with, Display Date Options. If User double taps one Date or more then send Push Notification setting meet location.

If Date accepts Push Notification Pop Up, the Date can then send to GamePlan where Date views Users and can Drag & Drop 'Finalize' & Accept. In the invention's preferred embodiment, the Push Notification Pop Up looks like an elegant, classy invitation with information including but not limited to: Who, What, Where, When, How much, etc.

If Date(s) accept after Push Notification, then Dates appear with a green check within GamePlan reel and can be Dragged & Dropped for 'Finalize'.

If a Date is compatible with User by 80% or more based on Location, 'Hearted' & 'Checked' events In Outings, IceBreaker Consumption, IceBreaker Interaction, Points Available, Events Attended & User Survey) and Date clicks 'Check' on a certain event in Outings Page, then send Push Notification to all Users nearby who Green lit the Date and meet compatibility percentage. A Date that accepts Users invitation may be displayed in the Inventions HomePage Map and Gameplan Respectably. Pop Up may state "Do you want to take [DATES NAME] out?"

If User exhausts the Dating Pool in Green/Yellow Light System, then Send To GamePlan to refine Dates by double tapping Dates, in Dating Reel, and send a Request to Dates, via the aforementioned classy invitation, via Push Notification.

If 'metered' Date removes 'meter' during date, then send Push Notification to User Stating "[DATES NAME] is enjoying her evening!"

If User does not satisfy Number of Points and Date is within 30% of averaged points spent to secure Date then User can purchase more points to secure Date, send Push Notification to User, "Almost there! Get more points to secure a date with [DATES NAME]". Only Dates who are Green Checked in to GamePlan Date Reel can User have option to buy more points for.

If User clicks "Group Outing" then send Push Notifications to Dates notifying Group Outing, which prompts automatic Meter. If Group Outing approved, then Dates receive automatic meter for the evening.

If User has similar IceBreaker Usage as other Dates, visible because of each Ice Breaker Push Notification pushed upon attendance at each new Outing, which has a 'Heart' Check or Dismiss Feature, then prioritize display in the present invention Page & HomePage Map.

If Users & more specifically the Date wanders out of radius a Push Notification with be sent to User "All Is Well?" If "All Is Well" end prompt, If Not, Date Survey Prompted, DNA Rating System, with option to automatically cancel, not without rating the Date first. If Date averaged below a 2.5 out of 5-star rating OPTION PROMPTED "End Date?" If Yes OPTION, "Select new date?" is prompted. ELSE Date is continued and a Push Notification is sent to Date stating "Please enjoy your evening with your date!" Date may no longer rank as high in the data pool in the present invention after consistent Dates Ended with them. With a continuation of cancellations back to back the User or Date is Suspended.

If a Date responds due to cancellation then Dates may receive 20% of Spending Gauge and averaged out with current Rating, and rating received on the Outing. The User or Date may be informed via Push Notification of the option to increase Rating.

Dates can Increase average Rating per the present invention's Application by 2.5%, of Star Rating Scale every time Date is on time. The User or Date may be informed via Push Notification for the option to increase their rating.

Dates can Increase average Rating per the present invention's Application by 5%, of Star Rating Scale by accepting Users within 10 mins. The User or Date may be informed via Push Notification for the option to increase their rating.

All push notifications may be able to be viewed in the notifications section within the application, instead of invitation in profile notification section.

Every Rating is illustrated by 1-5 Star system per each category. There are 4 Categories for Rating Dates which are Respect, Kindness, Loyalty, and Attentiveness. There are two Categories for Dates rating Users which are Respectfulness and Generosity. No Categories for Venues, Partnerships, & IceBreakers just 1-5 Star Pop UP i.e., Rate Venue.

If User is leaving a Venue, then User Can Rate the Venue with 1-5 stars via Pop Up.

If User has 'hearted' 10% of events in data pool, then a POP UP for GamePlan Page is Prompted.

If User has 'checked' represents booking, more than three events in the Outings Page in a (24 hr cycle) then POP UP for GamePlan is prompted.

If Date accepts Push Notification Pop Up, Looks like classy invitation with Who, What, Where, When, How much) then send to GamePlan where Date view User(s) one by one and Users GamePlan may populate Dates Event Reel ELSE can Drag & Drop 'Finalize' & Accept.

If User is a Date, then Date can only RED light 10% of the Dating Pool. If Date maxes out of RED lights, then POP UP may appear "I'm sorry, you've exceeded maximum amount of RED lights for the Day."

If a Date is Metered, then can only RED light 25% of the Dating pool. If User maxes out of RED lights, then POP UP may appear "I'm sorry, you've exceeded maximum amount of RED lights for the Day"

If a Date has 25% of the Red Lights remaining, then a Pop Up may appear.

If Date Accepts Outing Request upon 'Finalize' Via Push Notification Pop UP, then send to GamePlan.

If User or Date double checks event in event reel and drag & drops into drag & drop zone without Date or User and clicks 'finalize' then Display Pop Up 'Enter Solo Mode?' If Yes, then End Prompt If No then direct to Date Reel.

If Date clicks the Check in Outings Page, then send automatic Push Notifications to Users that Green Lit Date or even Yellow Lit if 80% compatibility or more. These actions are triggered when Date clicks the 'check' in Outings Page.

If User drags & drops to 'Finalize' and Date Also clicks 'Finalize' in Date(s) GamePlan then User is prompted to purchase Outing ELSE once purchase confirmed by User, then Push Notification is Pushed to all parties displaying Outing.

A Pop-Up may appear If a User Green Lit 25 Date(s) or has 70% compatibility with 10 Dates whichever happens first then send to GamePlan or Illuminate toggle.

If Date or User accepts invitation request, then User may receive a Push Notification & Date(s) image may appear with a green check in GamePlan Date Reel and Date is ready to be Dragged & Dropped for 'Finalize'.

If Date Clicks Finalize then Date disappears from every other User(s) queue except for the one Date Finalized with and User can confirm purchase, then Push Notification may be sent to both parties displaying Outing.

It is not until the User has Date(s) green checked in the queue, and then drags and drops one or more into drag & drop zone for Finalize & User purchases Outing that both may be notified with Push Notification.

If Date does not attend 1 Outing for every 25 Invitations, then reduce Point Request Value by 25%. Additional POP UP "Uh-Oh We've noticed you have had a lot of requests but have not been accepting any, is everything okay?" This number must fluctuate based on volume of active User base.

A further component/process of the present disclosure provides the Solo Mode process. If User or Date double checks event in Event Reel and drag & drops into drag & drop zone without Date or User and clicks 'Finalize' then Display Pop Up 'Enter Solo Mode' If Yes End Prompt If no, then direct to Date Reel.

In 'Finalize', Shopping Cart Date or User Has option to purchase one or multiple tickets in Solo Modes If User wants to attend a Ticketed Event without the full present invention's usage Experience, then enter SOLO MODE.

The present invention may also Have a Website for the Ticketing Agency to operate out of. If a Ticketed Event is selected, then User may be redirected to the present invention Ticketing Agency to proceed with the purchase of the Ticketed Event.

The present invention Ticketing Agency Website is also for direct purchase, without needing full arrangements, such as in Solo Mode.

Certain trending events are prioritized based upon partnership agreements. This must be an open ended system to promote affiliated partners and ticketed events available in the present invention's Ticketing Agency.

If the present invention's Ticketing Agency doesn't have the Events desired, then redirect them or purchase IN APP in accordance with the agreements set between the affiliated partners. Following a similar procedure to that of the present invention's Ticketing Agency Ticketed Events Purchase INApp, which is the Outings Page, or OUTofApp Link, which is associated with a Website purchase.

A further component/process of the present disclosure provides the All Percentages process. This defines equivalences for the ratings. Each Star is equivalent to 20% thus 5 stars=100%

If a Date averages 5 stars in all categories on an Outing, then the Date receives 15% of total preset Spending Gauge.

If a Date averages 4 stars in all categories on an Outing, then the Date receives 12% of preset Spending Gauge.

If a Date averages 3 stars in all categories on an Outing, then the Date receives 9% of total preset Spending Gauge.

If a Date averages 2.5 stars in all categories on an Outing, then the Date receives 7% of total preset Spending Gauge.

If a Date averages 2.5 stars or below in all categories on an Outing, then Date receives 5% of total preset Spending Gauge and Push Notification is sent "Uh-Oh you received a Low Rating".

If a Date responds due to cancellation, then Dates may receive 20% of Spending Gauge averaged out with current Rating and rating received on the Outing.

If Dates responds OnDemand then Dates may receive 20% of Spending Gauge averaged out with current Rating and Rating during the Outing.

Dates can Increase their average Rating per the present invention Application's by 2.5% (of Star Rating Scale) every time Date is on time.

Dates can Increase their average Rating per the present invention Application's by accepting Users within 10 mins by 5%, of Star Rating Scale.

If Date has 3 Consecutive Outings with Ratings Less Than 2.5 averaged Star Ratings, then move to back of Dating pool queue and Date requires 10% less Point Request Value LOOP.

If Date cancels on back to back Outings, then point value of Date is decreased by 10% and Rating Decreased by 10%.

If a Date cancels after acceptance of a User, then points are deducted and Rating decreased by 10%.

If User requests another Date after cancelling Date, then send Location Based Push Notifications to nearby Dates and prioritize User's Request in Dating Pool and reduce points cost for User by 15% to replace annulled Date.

If Date requires more points than User has then display Dates no more than 30% out of Users averaged Spending Gauge interactions.

If User is a Date, then Date can only RED light 10% of the Dating Pool. If User maxes out of RED lights, then POP UP may appear "I'm sorry, you've exceeded maximum amount of RED lights for the Day."

If a Date is Metered, then Metered Date can only RED light 25% of the Dating pool. If Metered Date maxes out of RED lights, then POP UP may appear "I'm sorry, you've exceeded maximum amount of RED lights for the Day."

If a Date only has 25% of the Red Lights remaining, then a POP UP may appear.

If a Date receives a substantial amount of Red lights, 65%, from the general community, then the Date may be substantially less visible in the present invention's Dating Pool and require less points or none.

If a User receives a substantial amount of Green lights, 70%, from the general community in a short amount of time, and Requests for Outings then the User may become a Date.

If a User becomes a Date then the Date must attend one Outing a week, have 85% Green Lights or more, have a rating above 3 stars, and have 3 or more invitation request per 24 hr cycle then the Date can maintain the 'metered' status and 5 Green Lights.

If a Date receives 80% Green lights from the general community in 72 hours, based on the population and frequency of Request, then the Date may be optioned for a meter.

If User does not satisfy Number of Points and Date is within 30% of averaged points spent to secure Date then User can purchase more points to secure Date, send Push Notification to User, "Almost there! Get more points to secure a date with [DATES NAME]". User only has option to buy more points for Checked Dates.

If a User who is Red Lit by A potential Date Plans an Outing that is set at 40% superior to what A Date typically earns in points, then User bypasses Red Light function.

If User has 90% or compatibility with Date, then bypass Red Light Function.

If Date clicks the Check in Outings Page, then send automatic Push Notifications to Users that Green Lit Date or even Yellow Lit if 80% compatibility or more. These actions are triggered when Date clicks the 'check' in Outings Page.

All compatibility between User(s) and Date(s) may be predicated on Percentage of similarities based upon User Intake Survey (the initial 5 question picture survey & the Word Based Survey 5 out of 100 questions that pop up every three Outings and every 100 Green Lights that feed back into the GameCenter), Icebreaker Usage, IceBreaker consumption, Rating, Events 'Hearted,' Events Attended, Events 'Checked', Location, Availability, Mood Gauge, GamePlan Icon Interaction, Belt-Level, Trail Interaction whether Online or Offline or Booked, Points required to book Date(s). If User has enough points required to book Date(s) or is within a 30% range, matching is predicated on more than whether a User green or yellow lit a date.

If User Green Lit 25 Date(s) or has 70% compatibility with 10 Dates whichever happens first, then Pop-Up may appear to send to GamePlan.

If User Green lights a Date, then Date appear in GamePlan If User & Date have at least 50% similar interest or have a Similar GamePlan or Date has Green or Yellow Lit User.

If User selects a Date within point range but does not have the points to satisfy the Date(s) 'Meter' (only applies to Metered Dates within 30% of Users averaged spending') then after Date(s) accepts Outing, notify User more points are required to secure Outing, after the User has clicked 'Finalize' in shopping cart.

If User receives 70% or more Green Lights, then User automatically becomes Date.

If User receives 60% or more Invitation request for Outings than User sends out via Push Notification and has 60% Green Lights, then User becomes a Date.

If User receives 90% more points than User Spends, Excluding reward system for attending events, then User becomes automatically becomes Date.

If Date Red Lit User, then Date may only show up In User(s) Date Reel If Users Spending Gauge is 30% more than what Date typically earns in Points or if User has 90% compatibility or more.

If Date is inactive 14 consecutive 24 hr Outing cycles or 14 days then Dates points request value, points required for User(s) to finalize with Date, depreciates not points accumulated by 10% LOOP. Calendar Blackout Days do not count toward 14.

If Date is inactive for 7 consecutive days then Push Notification, "we notice you've been inactive. Would you like to update your calendar?" Calendar Blackout Days do not count.

Each Star is equivalent to 20% thus 5 stars=100%

If a Date averages 5 stars in all categories during an Outing, then Date receives 15% of total preset Spending Gauge averaged with current Rating and Rating after the Outing.

If a Date averages 4 star in all categories during an Outing, then Date receives 12% of preset Spending Gauge averaged with current Rating.

If a Date averages 3 stars in all categories during an Outing, then Date receives 9% of total preset Spending Gauge averaged with current Rating.

If a Date averages 2.5 or more stars in all categories during an Outing, then the Date receives 7% of total preset Spending Gauge averaged with current Rating.

If Date receives Inferior to 2.5 average stars then Date receives 5% of total preset Spending Gauge and Push Notification is sent "Uh-Oh you received a Low Rating".

Dates can Increase their average Rating per the present invention's Application independent of Users by 2.5% of Star Rating Scale every time Date is on time. Date may be informed via Push Notification for the option to increase their rating an hour before first Outing and on the 1st, 3rd, 6th, 12th, 24th, Outing and every 6th Outing After. Unless Date is Late, remind Date on Next Outing 2 hrs Before first Outing and every 3rd Outing After.

If 'Metered' Date accepts 1 of first 5 Invitation Requests from Users, then Date can Boost Ratings per the present invention's Application By 20% Averaged with Past Ratings.

If Date accepts 1 of first 3 Invitation Requests Date Receives from Users Date can Boost Ratings per the present invention's Application By 20% Averaged with Past Ratings.

Dates can increase their average Rating by 5% per the present invention's Application by accepting User within 5 mins of the initial Push Notification from User to Date. The Date may be informed via Push Notification for the option to increase their rating.

If Date has 3 Consecutive Outings with Low Ratings Less Than 2.5 averaged Star Ratings, then move to back of Dating pool queue and Date requires 10% less points loop.

If User cancels on back-to-back Outings (Twice) then Date's point value is decreased by 10% and Rating Decreased by 10% LOOP.

If a User cancels after Finalize i.e. because of no show, or Tardiness 15 mins late, then send additional Push Notifications via Pop Ups allowing User(s) to communicate without chatting i.e. "[DATES NAME] is on her way and may be there in (15) mins (5-45 mins sliding scale adjustable by User or Date in Push Notification)." 2.5% of Users and Dates general points are deducted for Tardiness and Rating decreased by 5% and Date is less visible in Dating Pool.

If User requests another Date after cancellation of Date, then send Location Based Push Notifications to nearby Dates prioritize User Request in Dating Pool and reduce points cost for next Date(s) by 20% to replace User(s) annulled Date.

If Dates respond due to cancellation, then Dates may receive 20% of Spending Gauge averaged out with current Rating and Rating on Date.

Date's Home Page may be populated with Users that Date Green Lit, Users with hearted similar events, Date(s) that User(s) accepted but Users did not 'Finalize' with in time, and Users that meet 80% or more compatibility requirements.

If a User or a Date Green Lights or Yellow Lights each other with 80% compatibility or more then User and Date are more likely to show up in one-another's HomePage Map.

If User has 'hearted' 10% of events in Dating Pool, then a Pop up for GamePlan is Prompted.

If User has similar interest expressed of 70% or more 'hearted' or 'checked' events comparable to Date(s) in Dating Pool, then potential Date(s) may be prioritized in Users HomePage Map.

If a Date is compatible with User by 70% or more based on:
1. Location
2. 'Hearted' & 'Checked' events In Outings 3. IceBreaker Consumption
4. IceBreaker Interaction
5. Points Available
6. Events Attended
7. User Survey
8. Trail Interaction
9. Belt-Level
10. GamePlan Icons
11. Spending Gauge Date has Minimum Rating of 3 Stars on DNA Rating Scale. Date clicks 'Check' on any event in Outings Page, then send Push Notification to all Users nearby who Green or Yellow lit Date and meet compatibility percentage. "Do you want to take '[DATES NAME]' out?"

If a Date WANTS to go to a particular Event on a certain day, then select the 'Check' in the Outings Page to send a Push Notification to ALL User's who match the appropriate compatibility criteria-Including the price range (with an overhead of a 30% variable increase).

If a Date is compatible with User by 60% or more based on:
12. Location
13. 'Hearted' & 'Checked' events In Outings
14. IceBreaker Consumption
15. IceBreaker Interaction
16. Points Available
17. Events Attended
18. User Survey
19. Trail Interaction
20. Belt-Level
21. GamePlan Icons
22. Spending Gauge Date has Minimum Rating of 3 Stars on DNA Rating Scale Date clicks 'Check' on any event User HEARTed or CHECKed in Outings Page then send Push Notification to all Users nearby who Green lit the Date and meet compatibility percentage. "Do you want to take '[DATES NAME]' out?"

If Date clicks the Check in Outings Page, then send automatic Push Notifications to Users that Green Lit Date or even Yellow Lit if 80% compatibility or more. These actions are triggered when Date clicks the 'check' in Outings Page.

If Date requires more points than User has then display Dates no more than 30% out of Users averaged Spending Gauge interaction.

If User is a Date, then Date can only RED light 10% of the Dating Pool. If Date maxes out of RED lights, then POP UP may appear "I'm sorry, you've exceeded maximum amount of RED lights for the Day."

If a Date is Metered, then Date can only RED light 25% of the Dating pool. If User maxes out of RED lights, then POP UP may appear "I'm sorry, you've exceeded maximum amount of RED lights for the Day."

If a Date has 25% of the Red Lights remaining, then a POP UP may appear.

If User has 80% shared preferences and interests with a Yellow Lit Date, then Yellow Lit Date may supersede Green User in GamePlan Date Reel Unless Green Lit Date is superior in compatibility to Yellow Lit. These preferences and interests are determined by events 'hearted', Location, Interests, Intake survey, and IceBreakers 'hearted' or answered similarly.

If a User receives a substantial amount of Red lights 65% or more from the general community and User has not purchased an Outing, then User may be substantially less visible in the present invention's Dating Pool. If User receives 80% Red Lights then User may be invisible to Dating Pool unless User purchases points or Outings Once A Month, this does not take effect until after the User's first month.

If a User receives a substantial amount of Green lights (70%) from the general community in a short amount of time, and Requests for Outings then the User may become a Date.

A Pop-Up may appear. If a User Green Lit 25 Date(s) or has 70% compatibility with 10 Dates whichever happens first, then send to GamePlan or Illuminate GamePlan toggle.

If User & Date have at least 50% similar interest and only one has only Green Lit another then display in Date Reel if User & Date have 50% or more compatibility.

If User has Yellow Lit Date, then Display Date if similarities are 70% or more.

If a Date receives 80% Green Lights from the general community, then 'Meter' is automatically put on Date. Date must maintain at least 3 star averaged User Rating to sustain 'Meter' and sustain at least 3 invitation request per Online 24 hr cycle. Meter is based on the population and frequency of Request.

A Meter is determined by charging User 10% of Date(s) Point Request Value averaged with the total Outing(s) used to secure Date hourly.

If Metered Date is in group Outing, then Date may receive 15%

If Date does not attend 1 Outing for every 50 invitations, then make Date 100% less visible in Dating Pool.

If Date does not attend 1 Outing for every 25 Invitations, then reduce Point Request Value by 25%. Additional Pop Up "Uh-Oh We've noticed you have had a lot of requests but have not been accepting any, is everything okay?"

Date must attend one Outing per week, excluding calendar blackout, have 75% Green Lights or more, have a rating above 2.5, and have 3 or more invitation request per 24 hr cycle to maintain the 'metered' status, Unless Date Attends First or Second Request.

If User does not satisfy Number of Points to secure Date(s) and Date is within 30% of averaged points spent to secure Date then User can purchase more points to secure Date, send Push Notification to User, "Almost there! Get more points to secure a date with [DATES NAME]". (Only Dates who have accepted invitation request and are Green Checked In Date Reel is when User is notified he requires more points for specific Date).

If User has enough or is within a 30% range of Point Request Value in order to 'Finalize' with Date(s) then display in GamePlan Date Reel and based Upon whether a Date Green or Yellow Lit a Date.

A Pop-Up may appear If a User Green Lit 25 Date(s) or has 60% compatibility with 10 Dates whichever happens first then send to GamePlan.

If a User has satisfied the present invention's ArmCandy Page by Lighting 10-50% of Online Dating Pool, then send to Outings Page.

If Date did not Red Light User, then Date may show up In User(s) Date Reel Unless User is spending 30% more then what Date typically earns in Points or 90% or more compatibility.

If a User who is Red Lit by a potential Date Plans an Outing that is set at 30% superior to what A Date typically averages in points, then User bypasses Red Light function.

If User is Red Lit by a potential 'Metered' Date Plans an Outing 40% superior to what A Date typically earns in points, then The User bypasses Red Light function.

If User is Red Lit by potential Date and is 90% compatible, then bypass Red Light function.

If Date(s) have more than 2 invitations in 24 hr then increase points required by 10% for each User thereafter that sends Request within 24 hr cycle and limit visibility in The present invention's ArmCandy Page and HomePage Map to outside Users who have yet to request said Date that have inferior averaged Spending Gauges in comparison to the User in request group who has the highest Spending Gauge, or Users within Point Range to acquire Date, unless Date has similar Outing Requests.

If Date has appreciated by 75%-point value within 24 hr cycle and has at least 70% or more Green Lights from User(s) and Ratings above 2.5 then Date(s) acquires 'Meter'

If Date(s) receive 2 Request for Outings from Users within 5 mins then increase points required by 25%

If Date(s) receive 4 Request for Outings from Users within 5 mins then increase points required by 50% (so on so forth).

Date(s) with over 10 invitations per 24 hr cycle automatically receive meter If Date has 80% Green Lights or more.

IF User attends 1 Event per Outing THEN User recovers 2.5% of Points Spent ELSE unless Date is metered.

IF User attends 2 Events per Outing THEN User recovers 5% of Points Spent ELSE unless Date is metered.

IF User attends 3 Events per Outing THEN User recovers 7.5% of Points Spent ELSE unless Date is metered.

IF User attends a Select Event or Outing THEN 10% of points spent are recovered ELSE Unless Dates are Metered.

IF User attends 2 Select Events in One Outing THEN User recovers 12.5% of Points Spend ELSE Unless Date is Metered.

IF User attends 3 Select Events in One Outing THEN 15% of Points Spent are recovered in Joux.

Maximum discount cannot exceed aggregated discount 15%.

A further component/process of the present disclosure provides the Compatibility process. The Default Operating Statistic for Compatibility between User(s) & Date(s) is 60%.

If User has Yellow Lit Date, then Date may show up in GamePlan Date Reel If User and Date share 70% Compatibility.

If User and Date Have Green Lit each-other, then automatically display in GamePlan Date Reel and prioritize in HomePage.

If User has Green or Yellow Lit Date and Date has not yet Green, Yellow or Red Lit User then the general operating statistic for compatibility is 60%.

If User & Date have identical GamePlan or have check three of the same events that chronologically synchronize within 24 hrs then display in Game Plan If User or Date have not Red Lit each other.

If User has 'checked' 10% of events in data pool, then a POP UP for GamePlan Page is Prompted. Therefore, User can view all of the Date(s) in Date Reel that would like to attend the events User has 'hearted'.

If User has similar interest expressed by 70% or more 'hearted' or 'checked' events comparable to Date(s) in Dating Pool, then potential Date(s) may be prioritized in Users Home Page Map.

If User shares 70% or more compatibility with Date(s) then become prioritized in the present invention Page and a Yellow Lit Date can supersede A Green Lit Date in GamePlan Page.

If Dates 'Checked' an event that Date would like to attend and have few invitation requests from Users then Users Date has Red Lit may appear If Red Lit Users Have High Ratings of 3 stars or more, and 70% or more compatibility.

If User Green or Yellow lights Date(s), then Date(s) may appear in GamePlan (in order of percentage compatibility, ratings, and IceBreaker Usage, Location, Average Outing Request Acceptance Response Time, Events Date 'Hearted'.) for further action.

If a Date is compatible with User by 80% or more based on Location, 'Hearted' & 'Checked' events In Outings, IceBreaker Consumption, IceBreaker Interaction, Points Available, Events Attended & User Survey) and Date clicks 'Check' on a certain event in Outings Page, then send Push Notification to all Users nearby who Green lit the Date and meet compatibility percentage.

All compatibility between User(s) and Date(s) may be predicated on percentage of similar interest via User Intake Survey (the initial 5 question picture survey & the 5 out of 100 word based questions that pops up every three Outings, or every 100 Green Lights), Icebreaker Usage, IceBreaker Consumption, Ratings, Event 'Hearted, Events Attended, Events 'Checked', Location, Trail Interaction, Belt-Level, GamePlan Icons, Spending Gauge, Availability (Location whether Online or Offline or Booked), and Points required to book Date.

If User has enough or is within a 30% range, then display in GamePlan and based Upon whether a Date Green or Yellow Lit a Date.

If Date clicks the Check in Outings Page, then send automatic Push Notifications to Users that Green Lit Date or even Yellow Lit if 80% compatibility or more. These actions are triggered when Date clicks the 'check' in Outings Page.

If a User Green Lit 25 Date(s) or has 70% compatibility with 10 Dates whichever happens first, then illuminate Game Plan Toggle and send to GamePlan.

If User Green Lights a Date Date(s) appear in GamePlan If User & Date have at least 60% similar interest or have a Similar (2 of 3) GamePlan Event Reel or have Green or Yellow Lit each-other.'

If Date Red Light User, then Date may show up In User(s) Date Reel Unless User is spending 30% more then what Date typically earns in Points or 90% or more compatibility.

A further component/process of the present disclosure provides the Partnerships process. If a User utilizes one of the partnerships available, then the User may automatically receive 50 points.

If User or Date(s) Checks Event(s) in GamePlan Event Reel and click finalize then POP UP display (solo mode) then it may give the discount to the User. i.e., If it is a 15% aggregated discount then that may discount may be given to the User.

If a User has their Spending Gauge at the maximum or a substantially large amount, then their discount rate would be much less.

If a User requests a 'metered' User and has the maximum Spending Gauge set, then the 'metered' user may not receive meter wage, because of the percentage from the discount.

If a User has the maximum Spending Gauge set, and requests multiple Dates instead of one, then the Spending Gauge earnings may be split among the multiple Dates and Meter is forfeited.

If a Date receives Excellent and Superb 5 Star Rating from User, then Date earns a higher percentage of Spending Gauge.

If a Date averages 5 stars in all categories during an Outing, then Date receives 15% of total preset Spending Gauge averaged with current Rating and Rating after the Outing.

If a Date averages 4 star in all categories during an Outing, then Date receives 12% of preset Spending Gauge averaged with current Rating.

If a Date averages 3 stars in all categories during an Outing, then Date receives 9% of total preset Spending Gauge averaged with current Rating.

If a Date averages 2.5 or more stars in all categories during an Outing, then the Date receives 7% of total preset Spending Gauge averaged with current Rating.

If Date receives Inferior to 2.5 average stars then Date receives 5% of total preset Spending Gauge and Push Notification is sent "Uh-Oh you received a Low Rating".

If Dates would like to Increase their average Rating per the present invention's Application by 2.5% (of Star Rating Scale) then every time Date is on time 2.5% is averaged into overall percentages.

Dates can Increase their average Rating per the present invention's Application by accepting Users within 10 mins by 5% (of Star Rating Scale).

A further component/process of the present disclosure provides the Invitations process. The User can send out invitation through plug ins Instagram, Facebook, Twitter, Text, Email. Verify Photo, Verify Phone Number, Verify Social Media Accounts.

A further component/process of the present disclosure provides the Help process (1202) as depicted in FIG. 12. This comprises of several sub-processes, including but not limited to: App Walk-Through (stage 1204), Helpful Hints (stage 1206 as shown in FIG. 12), Compatibility Questions (stage 1208), Ways to increase Rating (stage 1210) and also GameCenter methods of social interaction enhancement (stage 1206 as shown in FIG. 12).

A further component/process of the present disclosure provides the optional retrofit dongle. This is an electronic device dedicated to geolocation. In the invention's preferred embodiment, the dongle is approximately the size of a cigarette butt. It may utilize industry-standard geolocation techniques such as WiFi hotspot correlation to narrow the location down to within 5 feet, in the invention's preferred embodiment. Alternative or future embodiments of the invention may utilize Bluetooth and GPS to make the geolocation even more accurate. Importantly, the dongle is closely tied into the AC GNSS system, described later in this disclosure. In addition, the dongle may also have an integrated battery pack. This can aid with the high power drain of the mobile device, and help mitigate the power-draining effects of continually searching and checking for users in proximity even while offline.

A further component/process of the present disclosure provides the optional customized phone case. In the invention's preferred embodiment, this may include geolocation functionality similar to the dongle in the preceding description. In addition, the phone case may also have an integrated battery pack used to recharge the phone, similar to the dongle. As with the dongle, this can aid with the high power drain of the mobile device.

A further component/process of the present disclosure provides the AC GNSS system which ties into many of the aforementioned components, described as follows. This provides the ability to connect with other field sensors that emit format data simultaneously with a GPS, so data from multiple sensors can be incorporated into the data-collection application.

All active Users and Dates of the present invention Application may receive the aforementioned phone dongle designed exclusively for the present invention's Network to enhance the present invention's Application experience.

As mentioned the Dongle may have a slim case to fit around the bottom of the mobile device, and is roughly the size of a cigarette butt in the invention's preferred embodiment. The location of the Dongle on the mobile device enables it to double as a "back-up battery life" by holding a 40% charge for the mobile device to be administered through the connection at the bottom of the mobile device. The Dongle itself can be charged by the USB output for wall charging or the solar cells on the back of it by either being outside or leaving it on a windowsill or a table that receives direct sunlight. An additional model may not have solar panels and merely a connection for a USB charger.

Beyond supplying an additional full battery life, the Dongle may be able to assist in creating the perfect the present invention's experience with the usage of free, offline outer net connection to the GNSS satellite network. The benefits of such a connection are described as follows:

First, there is increased safety. This can be subdivided into categories and sub-processes:

Further provided is Familiarity. The Dongle creates a predictable familiarity when people are engaging in any the present invention's orchestrated Outings. This is recognized first of all by the trademarked phone Dongle that EVERY member of the present invention's Network may have to ensure validation among people who may be meeting for the first time.

Further provided is Predictability. The accurate GNSS system is designed to override the internal GPS on iOS device with the location data coming from the external GPS so all existing apps using internal location services can benefit from the increased accuracy without any changes to the app. This creates an extremely accurate prediction system for arriving Dates and the orientation of meeting-up with people to engage in the present invention's Outings.

There are Parameters. The accurate GNSS system may be able to map out the interior of all Event locations being attended by emitting and receiving data from the satellite networks as well as any devices also on the network. These Parameters are essential to the safety and predictability of the application to ensure that no one gets lost either in the venue or separated from their Date.

Further provided is a Separation Radius: The present invention's application enforces the agreement of set radii used during all Outings orchestrated by the present invention. The Dongle is essential for this feature by maximizing the accuracy of the location relative to the radius of the User/Date agreement.

Further provided is an Outing Cessation. To aid in the Safety of the application the Dongles also ensure that the Date has ended and that everyone had a good time.

Next, there is the category of Functionality Within the Application.

Further provided is a Precise Search Radius. The present invention's Page is filtered by a search radius and the more accurate the location the more efficient the application becomes. This is most notable with people who are traveling and need their radius updated by the second.

Further provided is a Moving Network. As the GNSS Detects movement (traveling) of the Mobile Device the Dates may automatically be filtered as they move into or out of the selected radius set ensuring that only Dates with the proper proximity to the User may be shown.

There are New Events: Events may be constantly updated as the mobile signal moves into new areas of the map depending on the proximity to locations for ticketed events as well as businesses affiliated with the present invention.

Further provided is Movement Communication: A Push Notification to state that the search radius for the present invention's Events and Dates had been adjusted because the GNSS system detected a substantial difference in location. "We noticed you've been traveling! You may see NEW Events and Dates for your current Location!" Then Promoted to select "OK" or "Take me Home" which may allow the regular Dates and Events in their Home Location to remain on the feed (assuming that they are heading back home or booking in advance)

Notably, the Filtered Events and Dates may constantly be filtered dependent on movement and other factors. However, the push notification may ONLY show up when a substantial distance has been traveled such as to a new city. Within the City limits, e.g., from East side to West side. The feed may automatically sync without notification.

Further provided is Accurate Mapping Data: The GNSS System is integrated into the present invention's Ticketing agency to create accurate parameters and mapping solutions. This is useful both within the application during Event booking and in action for the duration of the Event to provide directions, parameters and suggestions.

Further provided is support for Interior Mapping: Interior maps are made for the stadiums, platforms, booths and elite reservations which the ticketing agency may be selling tickets as well as the mapped out interiors of all business locations promoted on the present invention to ensure that the purchaser gets what they are looking for through clear communication about the Event.

Further provided is Exterior Mapping. Exterior mapping shows the street maps around the precise location of every Event available on the present invention's Application.

There are Location Directions. As a result of Exterior mapping and the location of the mobile device directions can be provided through the application so that the Event can be found with ease.

Further provided is a Personal Radius process: The Radii set between the Date(s) and User(s) whilst on an Outing to ensure that they don't become separated. Should they do so the safety notification may pop up to ensure that everything is okay and everything is going well on the mobile devices of all parties involved.

Further provided is Push Notification Activation. Push Notifications are activated throughout the day and throughout the duration of any the present invention's Outing. The Dongle may recognize the movement from one location to another, the meeting or separating of peoples as well as the initial arrival and the final separation. As a result, Icebreakers, periodically, Safety Notifications, regarding Date Radius, Arrival Times, location and suggested arrival time and Suggestions, proximity to other Events, Directions, Advertisement etc. may all be activated depending on the data emitted.

There are IceBreakers. These are the same IceBreakers described earlier in the disclosure. IceBreakers are initiated at the beginning of every Outing and the Arrival of every event unless they have been manually shut off by both parties. The location of the mobile signals may enable the system to know when to initiate the push notifications for the IceBreakers.

Further provided is Arrival Communication. As the Outing is about to begin and the Date is coming to meet the User, Or the User arriving to pick up the Date the arrival time may be sent and the image of the other person may pop up in the application so there may be no problem finding the other if this is a first time Outing.

Further provided is Direction. As a result of Exterior mapping and the location of the mobile device directions can be provided through the application so that the Event can be found with ease.

Further provided is Safety. The Radius's set between the Date(s) and User(s) whilst on an Outing to ensure that they don't become separated. Should they do so the safety notification may pop up to ensure that everything is okay and everything is going well on the mobile devices of all parties involved.

Further provided is Event Promotion. Events in the proximity of the signal of the mobile device can be promoted during the initial search. But also, push notifications can be sent during an Outing if they don't have the "complete Outing" of three Events. For instance, if a User has booked one Outing at a restaurant and the Application recognizes that based on the GNSS signal they are in very close proximity to a great evening Event the application system may then promote this Event to prolong the evening should the parties be having a good time. The Date would have to accept the additional Event.

Further provided is Quality Assurance. Push Notifications after every Event may be requesting an evaluation of the Event a "Later" button is also available on the push notification. At the end of the evening a full evaluation is prompted for the other party and any unevaluated Events attended.

Further provided is Survey Initiation. Surveys are activated upon the cessation of an Event, the movement around or between Venues and upon Outing completion. Depending on the Data Emitted.

Further provided is Event Survey. Push Notifications after every Event may be requesting an evaluation of the Event a "Later" button is also available on the push notification. To evaluate the quality of the Event location.

Further provided is Date/User Evaluation. At the end of the evening a full evaluation is prompted for the evaluation of all Users and Dates that attended the Outing to evaluate the outcome. These evaluations are pivotal in the calculation of the User/Date's ratings and points.

There are Safety Backup Surveys. The Radius's set between the Date(s) and User(s) whilst on an Outing to ensure that they don't become separated. Should they do so the safety notification may pop up to ensure that everything is okay and every thing is going well on the mobile devices of all parties involved.

Further provided is Boredom Recognition. If someone is not notably moving too much and the data mining is collecting signals of mindless browsing, boredom recognition may be activated and promotions or push notifications may be initiated.

There are Location Signals. Based on the GNSS signals of the Mobile device the location can be determined, this aids in the filtering of Dates and Events in the present invention's HomePage Map.

Further provided is a Movement Monitor. The amount of movement detected may help to determine whether someone is sedentary in one place and possibly "bored".

Further provided is Data Tracing. In conjunction with data collection of phone usage and "mindless browsing" the application system can determine the availability of the individual or whether or not they may be "bored".

Further provided is Event Promotion. This may stimulate push notifications to promote new events and suggestions for Outings that evening.

Further provided is Selective Promotion. Based on movement patterns and data mining regarding data usage the promotions may be pre-selected to what is most likely to be successful.

Further provided is a DNA Rating system. This is the same DNA Rating system from earlier; it allows check in check out of locations' push notification.

Further provided is WiFi and Network Positioning. For any GPS to work the antennae needs a clear view of the sky. Users of smart phones may frequently be in "urban canyons" or indoors. This is where WiFi and cellular network positioning become necessary. Both of these methods are used by smart phones as indoor positioning systems.

Generally, WiFi positioning is more accurate than cellular network positioning. It uses wireless access points and measures the intensity of the received signal from one or more networks to find the position. Interestingly it doesn't require your device to be WiFi enabled to work. Bluetooth dongle disconnection may trigger geolocation processes.

IV. Platform Architecture

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 200 through 1200 have been described to be performed by a computing device 1800, it should be understood that, in some embodiments, different operations may be performed by different networked elements in operative communication with computing device 1800.

Embodiments of the present disclosure may comprise a system having a memory storage and a processing unit. The processing unit coupled to the memory storage, wherein the processing unit is configured to perform the stages of methods 200 through 1200.

Figure 18:
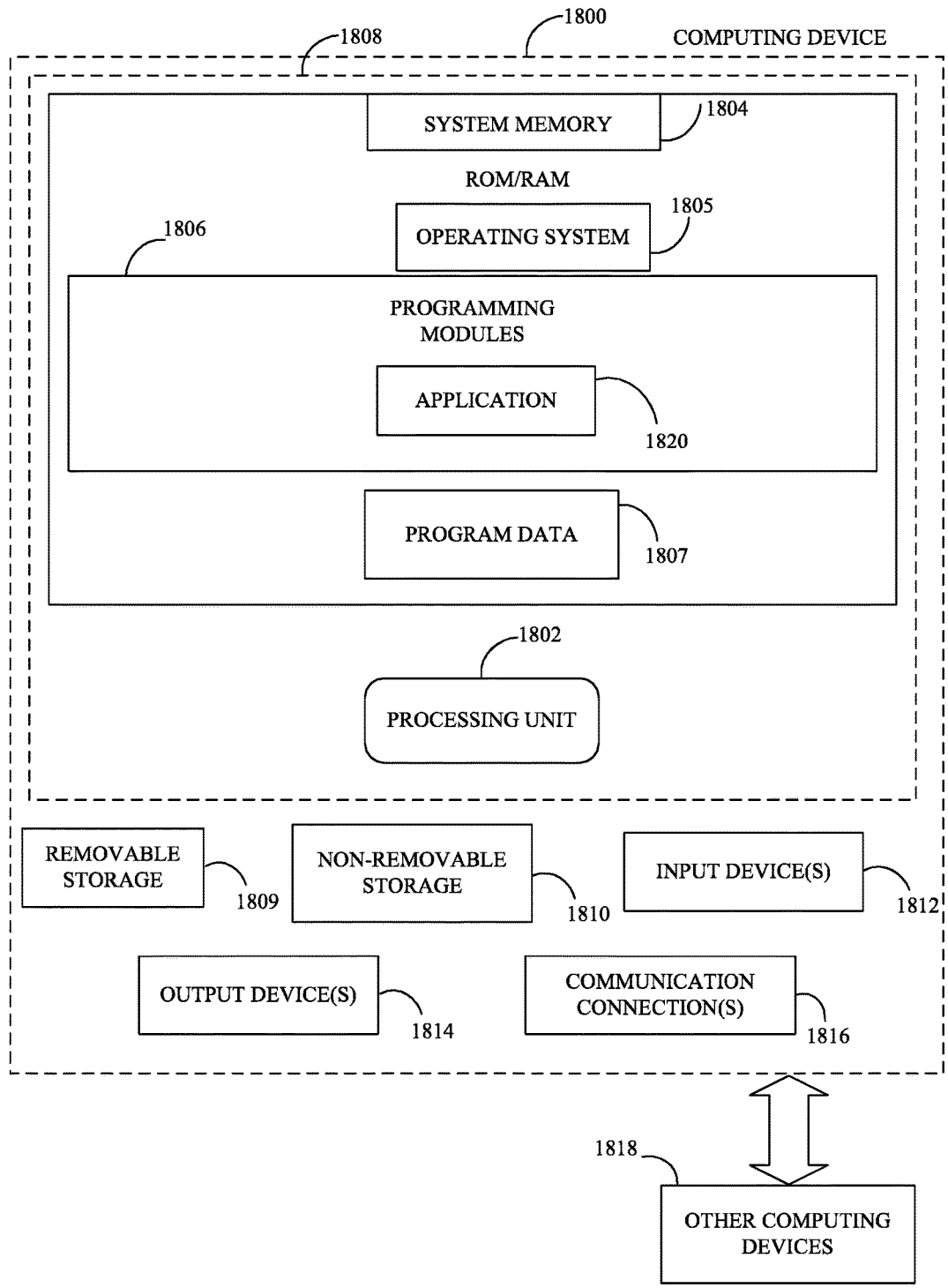
FIG. 18 illustrates a block diagram of a system 1600 for facilitating social networking based on events, in accordance with some embodiment.

FIG. 18 is a block diagram of a system including computing device 1800. Consistent with an embodiment of the disclosure, the aforementioned memory storage and processing unit may be implemented in a computing device, such as computing device 1800 of FIG. 18. Any suitable combination of hardware, software, or firmware may be used to implement the memory storage and processing unit. For example, the memory storage and processing unit may be implemented with computing device 1800 or any of other computing devices 1818, in combination with computing device 1800. The aforementioned system, device, and processors are examples and other systems, devices, and processors may comprise the aforementioned memory storage and processing unit, consistent with embodiments of the disclosure.

With reference to FIG. 18, a system consistent with an embodiment of the disclosure may include a computing device or cloud service, such as computing device 1800. In a basic configuration, computing device 1800 may include at least one processing unit 1802 and a system memory 1804. Depending on the configuration and type of computing device, system memory 1804 may comprise, but is not limited to, volatile (e.g. random access memory (RAM)), non-volatile (e.g. read-only memory (ROM)), flash memory, or any combination. System memory 1804 may include operating system 1805, one or more programming modules 1806, and may include a program data 1807. Operating system 1805, for example, may be suitable for controlling computing device 1800's operation. In one embodiment, programming modules 1806 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 18 by those components within a dashed line 1808.

Computing device 1800 may have additional features or functionality. For example, computing device 1800 may also include additional data storage devices (removable and/or non-removable) such as, for example, magnetic disks, optical disks, or tape. Such additional storage is illustrated in FIG. 18 by a removable storage 1809 and a non-removable storage 1810. Computer storage media may include volatile and nonvolatile, removable and non-removable media implemented in any method or technology for storage of information, such as computer readable instructions, data structures, program modules, or other data. System memory 1804, removable storage 1809, and non-removable storage 1810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1800. Any such computer storage media may be part of device 1800. Computing device 1800 may also have input device(s) 1812 such as a keyboard, a mouse, a pen, a sound input device, a touch input device, etc. Output device(s) 1814 such as a display, speakers, a printer, etc. may also be included. The aforementioned devices are examples and others may be used.

Computing device 1800 may also contain a communication connection 1816 that may allow device 1800 to communicate with other computing devices 1818, such as over a network in a distributed computing environment, for example, an intranet or the Internet. Communication connection 1816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1804, including operating system 1805. While executing on processing unit 1802, programming modules 1806 (e.g., application 1820) may perform processes including, for example, stages of one or more of methods 200 through 1200 as described above. The aforementioned process is an example, and processing unit 1802 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A computer implemented method of facilitating social networking, the computer implemented method comprising:
   displaying an initial survey comprising a plurality of questions to a user;
   displaying a plurality of pictures corresponding to a plurality of answers to the plurality of questions;
   receiving at least one selection of the plurality of pictures from the user; and
   identifying at least one personal characteristic of the user based on the at least one selection, wherein the at least one personal characteristic comprises a perceived personality, an interest and an intention;
   presenting each of a plurality of events and a plurality of dates to a user, wherein each of the plurality of events and the plurality of dates are identified based on the at least one personal characteristic of the user;
   receiving, a plurality of date-interest indicators corresponding to the plurality of dates, wherein each of the plurality of date-interest indicators represents one of approval, disapproval and possibility of the user engaging correspondingly with each date the plurality of dates;

receiving, a plurality of event-interest indicators corresponding to the plurality of events, wherein each of the plurality of event-interest indicators represents one of approval, disapproval and possibility of the user attending correspondingly each event of the plurality of events;

determining a plurality of compatibility levels between the user and the plurality of dates based on a comparison of the at least one personal characteristic of the user and at least one personal characteristic of the plurality of dates;

generating a prioritized plurality of dates based on a plurality of date-interest indicators associated with the plurality of dates and a plurality of compatibility levels associated with the plurality of dates;

generating a prioritized plurality of events based on a plurality of event-interest indicators associated with the plurality of events;

receiving, a selection of at least one of an event and a date; and presenting at least one of the prioritized plurality of dates and the prioritized plurality of events based on the selection of at least one of the event and the date.

2. The computer implemented method of claim 1 further comprising presenting three date-interest-GUI elements characterized by three colors for each date of the plurality of dates, wherein the three colors correspond respectively to approval, disapproval and possibility, wherein receiving the plurality of date-interest indicators comprises receiving an interaction with one of the three date-interest-GUI elements from the user.

3. The computer implemented method of claim 1 further comprising presenting three event-interest-GUI elements characterized by three colors for each event of the plurality of events, wherein the three colors correspond respectively to approval, disapproval and possibility, wherein receiving the plurality of event-interest indicators comprises receiving an interaction with one of the three event-interest-GUI elements from the user.

4. The computer implemented method of claim 1 further comprising:

generating an aggregated date-interest indicator for the date based on aggregating date-interest indicators associated with the date received from a plurality of users; and presenting the aggregated date-interest indicator associated with the date to the user.

5. The computer implemented method of claim 1 further comprising presenting a plurality of points indicator corresponding to at least one of the plurality of events and the plurality of dates, wherein a points indicator corresponding to at least one of an event and a date represents a number of points to be expended by the user in association respectively with at least one of attending the event and inviting the date.

6. The computer implemented method of claim 1, wherein the at least one personal characteristic is identified further based on at least one of a location of the user, a mood of the user, response to an additional survey, and a spending gauge associated with the user.

7. The computer implemented method of claim 6, wherein the at least one personal characteristic is identified further based on interaction with other users, icebreaker usage, icebreaker interaction, number of available credits associated with the user, events hearted by the user, events checked by the user, events attended by the user and DNA rating scale of the user.

8. The computer implemented method of claim 1 further comprising:

receiving a trail from a user, wherein the trail comprises a plurality of locations corresponding to a plurality of events;

storing, the trail in a storage device; and assigning a trail reward to the user based on receipt of the trail.

9. The computer implemented method of claim 8 further comprising:

presenting the trail to a plurality of users;

receiving a feedback associated with the trail from the plurality of users; and ranking the trial based on the feedback.

10. The computer implemented method of claim 8, wherein assigning the trail reward is further based on the feedback associated with the trail.

11. The computer implemented method of claim 1 further comprising:

detecting attendance of the user at an event;

assigning an attendance reward to the user based on the detecting, wherein the attendance reward is associated with the event.

12. The computer implemented method of claim 11, wherein the attendance reward associated with the event is based on a type of event.

13. The computer implemented method of claim 12, wherein the attendance reward is further based on at least one of an engagement rating received from the date, a frequency of events attended and a number of events attended.

14. The computer implemented method of claim 1 further comprising identifying the plurality of events based on a budget associated with the user.

15. The computer implemented method of claim 14, wherein an average cost of attending each event of the plurality of events is at most 130% of the budget associated with the user.

16. The computer implemented method of claim 1 further comprising determining a location of the user using a dongle configured to be attached to a mobile device of the user.

17. The computer implemented method of claim 16, wherein the dongle is further configured to provide backup power to the mobile device.

18. The computer implemented method of claim 1 further comprising:

presenting an icebreaker to at least one of the user and the date upon expiration of a predetermined time period from start of the event, wherein the icebreaker is identified based on at least one of the at least one personal characteristic of the user and the at least one personal characteristic of the date; and receiving an icebreaker interaction from at least one of the user and the date.

* * * * *